United States Patent
Kashiwa et al.

(10) Patent No.: US 10,068,158 B2
(45) Date of Patent: *Sep. 4, 2018

(54) IMAGE PROCESSING SYSTEMS AND METHODS FOR AUTOMATICALLY GENERATING IMAGE ALBUM DATA FROM MULTIPLE CAMERAS

(71) Applicant: Sony Corporation, Tokyo (JP)

(72) Inventors: Kotaro Kashiwa, Kanagawa (JP); Kazuyuki Marukawa, Kanagawa (JP); Yukihiro Ohzeki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,810

(22) Filed: Oct. 31, 2013

(65) Prior Publication Data

US 2014/0056539 A1    Feb. 27, 2014

Related U.S. Application Data

(63) Continuation of application No. 11/312,161, filed on Dec. 20, 2005, now Pat. No. 8,599,275.

(30) Foreign Application Priority Data

Dec. 21, 2004    (JP) ................................ 2004-369522

(51) Int. Cl.
*H04N 5/225* (2006.01)
*H04N 5/76* (2006.01)
(Continued)

(52) U.S. Cl.
CPC .............. *G06K 9/80* (2013.01); *G11B 27/034* (2013.01); *G11B 27/10* (2013.01);
(Continued)

(58) Field of Classification Search
CPC ........... H04N 1/00196; H04N 1/00209; H04N 2201/0031; H04N 2201/0032; H04N 5/23293; H04N 1/00442
(Continued)

(56) References Cited

U.S. PATENT DOCUMENTS 5,455,625 A    10/1995 Englander
5,579,066 A    11/1996 Miyamoto et al.
(Continued)

FOREIGN PATENT DOCUMENTS

JP    11-164282    6/1999
JP    2001-148822    5/2001
(Continued)

*Primary Examiner* — Sinh Tran
*Assistant Examiner* — Selam Gebriel
(74) *Attorney, Agent, or Firm* — Chip Law Group

(57) ABSTRACT

First image data captured by a first image pickup apparatus and second image data captured by a second image pickup apparatus are stored in storing means. Thus, it is possible to correlate images with each other by using identification information of a user or the image pickup apparatus and identification information of an image capturing time, an image capturing position, or an image pickup target (event). Further, the correlated image data is edited on the basis of editing structure data, thereby generating album image data.

23 Claims, 14 Drawing Sheets

(51) Int. Cl.
  *G06K 9/80* (2006.01)
  *G11B 27/034* (2006.01)
  *G11B 27/10* (2006.01)
  *H04N 1/00* (2006.01)
  *H04N 9/804* (2006.01)
  *H04N 9/82* (2006.01)

(52) U.S. Cl.
  CPC ..... *H04N 1/00132* (2013.01); *H04N 1/00196* (2013.01); *H04N 9/8042* (2013.01); *H04N 9/8205* (2013.01); *H04N 2201/3204* (2013.01); *H04N 2201/3214* (2013.01); *H04N 2201/3247* (2013.01); *H04N 2201/3253* (2013.01)

(58) Field of Classification Search
  USPC .............. 348/211.3, 211.1, 333.01, 231.2
  See application file for complete search history.

(56) References Cited

U.S. PATENT DOCUMENTS

| | | | |
|---|---|---|---|
| 6,204,877 B1 | 3/2001 | Kiyokawa | |
| 6,208,379 B1 | 3/2001 | Oya et al. | |
| 6,288,792 B1 | 9/2001 | Yoshida et al. | |
| 6,356,295 B1 | 3/2002 | Mano | |
| 6,567,121 B1 | 5/2003 | Kuno | |
| 6,628,899 B1* | 9/2003 | Kito | 396/56 |
| 6,670,933 B1 | 12/2003 | Yamazaki | |
| 6,909,457 B1 | 6/2005 | Fukasawa | |
| 7,139,018 B2 | 11/2006 | Grosvenor et al. | |
| 7,193,645 B1 | 3/2007 | Aagaard et al. | |
| 7,205,958 B2 | 4/2007 | Yamazaki | |
| 7,460,781 B2* | 12/2008 | Kanai et al. | 396/263 |
| 7,689,909 B1* | 3/2010 | Szuszczewicz | 715/243 |
| 2002/0005902 A1 | 1/2002 | Yuen | |
| 2002/0110370 A1 | 8/2002 | Nomura | |
| 2002/0135682 A1 | 9/2002 | Oka et al. | |
| 2002/0154213 A1 | 10/2002 | Sibyama et al. | |
| 2003/0051207 A1 | 3/2003 | Kobayasa et al. | |
| 2003/0133018 A1 | 7/2003 | Ziemkowski | |
| 2004/0135904 A1* | 7/2004 | Shiota | G06F 17/30265 348/231.99 |
| 2004/0183915 A1 | 9/2004 | Gotohda et al. | |
| 2005/0277405 A1 | 12/2005 | Noguchi | |
| 2006/0028548 A1* | 2/2006 | Salivar | G08B 13/19643 348/143 |
| 2006/0203012 A1 | 9/2006 | Nakajima | |
| 2007/0285339 A1 | 12/2007 | Yamazaki | |
| 2008/0007625 A1 | 1/2008 | Reid et al. | |

FOREIGN PATENT DOCUMENTS

| | | |
|---|---|---|
| JP | 2001-177750 | 6/2001 |
| JP | 2003-125280 | 4/2003 |
| JP | 2003-274251 | 9/2003 |
| JP | 2003-274396 | 9/2003 |
| JP | 2004-112770 | 8/2004 |

* cited by examiner (a) LOCAL-CAMERA CAPTURED IMAGE VL (b) COMMON-CAMERA CAPTURED IMAGE Vc (c)

(d)

(a)

(b)

(c)

IMAGE PROCESSING SYSTEMS AND METHODS FOR AUTOMATICALLY GENERATING IMAGE ALBUM DATA FROM MULTIPLE CAMERAS

The subject matter of application Ser. No. 11/312,161, is incorporated herein by reference. The present application is a Continuation of U.S. Ser. No. 11/312,161, filed Dec. 20, 2005, which claims priority to Japanese Patent Application Number JP 2004-369522 filed Dec. 21, 2004, all of which are incorporated herein by reference.

BACKGROUND OF THE INVENTION

The present invention relates to an image editing apparatus, an image pickup apparatus, an image editing method, and a program for creating a so-called album by using image data captured by a plurality of image pickup apparatuses.

Recently, a still camera and a video camera for recording captured still-image data and moving-image data to a recording medium, e.g., a disc medium, a tape medium, and a solid-memory medium, has been generally widespread, and users have been able to easily enjoy the image capturing.

For example, many people capture images from a still camera and a video camera at an athletic competition, various events, an amusement park, and a tourist resort.

In accordance with the improvement of such an environment that a general user can easily enjoy the still image or moving video image at home, various services, such as distributing services of the moving image and the still image or photographing service at an amusement park, are proposed or are realized. For example, Japanese Unexamined Patent Application Publication No. 2001-148822 discloses a technology of a photographing service.

The captured image data is collected and, then, can be edited in a style of a so-called photo album or video album, thereby increasing enjoyable chances of using the captured image by a user.

For example, upon creating an album which collects still images, it is considered that an interesting album having various images can be created by using images captured by a plurality of photographers or a plurality of image pickup apparatuses, instead of the collection of only images captured by a single person.

Further, for example, an image captured by a general user and an image captured by a photographer (professional photographer) are combined, thereby creating an album. Thus, the album has a combination of images captured by the professional photographer with high quality and a bird's eye view and of private images captured by the general user. In an athletic competition of an elementary school, as an example thereof, the general user normally captures main images of his/her child and, particularly, during a sport, he/she captures zoomed-up images of only his/her child in many cases. Obviously, the above-captured video image is valuable for the image capturing person or family. However, the whole sport can never be understood. On the other hand, the image of the whole sport is captured in the bird's eye view, then, the image of his/her child cannot be large, and the image is not preferable for the image capturing person in many cases.

Herein, when the professional photographer simultaneously captures the image of the whole sport and, then, the general user wants to see the image captured by the professional photographer as well as the image captured by him/her.

In such a case, if the album can be edited by combining both the images, it is considered that the album is greatly useful.

If not the professional photographer but a plurality of general users, such as friends, can collect and edit the individually-captured image data as an album, the album becomes interesting.

However, a system for collecting and easily editing the images captured by both the general user and the professional photographer or the images captured by the general users is not conventionally provided.

SUMMARY OF THE INVENTION

It is an object of the present invention to provide an image editing apparatus, an image pickup apparatus, an image editing method, and a program, in which an album can be easily edited by using image data captured by a plurality of image pickup apparatuses.

An image editing apparatus according to the present invention comprises: correlation detecting means that detects, from first image data obtained by image capturing of a first image pickup apparatus and second image data obtained by image capturing of a second image pickup apparatus, the correlation between a specific piece of the first image data and a specific piece of the second image data; and image editing means that edits the first and second image data whose correlation is detected by the correlation detecting means on the basis of editing structure data, and sets image data for output.

The image editing apparatus further comprises: input means that inputs the first image data obtained by the image capturing of the first image pickup apparatus and the second image data obtained by the image capturing of the second image pickup apparatus, to be stored to storing means.

Alternatively, the image editing apparatus is arranged in one of the first image pickup apparatus and the second image pickup apparatus, and further comprises input means that inputs the image data obtained by the image capturing of the other image pickup apparatus, to be stored to storing means.

The image editing apparatus further comprises: link processing means that correlates the specific piece of the first image data with the specific piece of the second image data.

The link processing means correlates the specific piece of the first image data with the specific piece of the second image data on the basis of additional information added to the first image data and the second image data. The additional information is identification information of the individual image pickup apparatuses or a user, image-capturing time information, image-capturing positional information, or identification information of an image pickup target.

The image editing apparatus further comprises: selecting means that selects editing structure data used for image edition by the image editing means from a plurality of pieces of the editing structure data.

The image editing means determines the layout of the first and second image data on the basis of the editing structure data.

The image editing apparatus further comprises: output means that outputs the image data for output generated by the image editing means, as print data, output means that sends and outputs the image data for output generated by the image editing means, output means that records, to a recoding medium, the image data for output generated by the image editing means, or output means that uploads, to a network server, the image data for output generated by the image editing means.

An image pickup apparatus for obtaining image data by image capturing according to Claim the present invention comprises: processing means that correlates the image data by the image capturing with the image data obtained by image capturing of another image pickup apparatus.

The processing means is link processing means that correlates the image data obtained by the image capturing with the image data obtained by the image capturing of the other image pickup apparatus.

The link processing means correlates a plurality of pieces of image data with each other on the basis of additional information added to the image data obtained by the image capturing of the image pickup apparatus and to the image data obtained by the image capturing of the other image pickup apparatus.

The image pickup apparatus further comprises: input means that inputs the image data obtained by the image capturing of the other image pickup apparatus to be stored to storing means.

The image pickup apparatus further comprises: image editing means that edits a plurality of pieces of the image data correlated with each other by the processing means on the basis of editing structure data and sets image data for output.

The image pickup apparatus further comprises: selecting means that selects the editing structure data used for the image edition by the image editing means from a plurality of pieces of the editing structure data.

The image editing means determines the layout of a plurality of pieces of the image data correlated with each other by the processing means on the basis of the editing structure data.

An image pickup apparatus for obtaining image data by image capturing according to the present invention comprises: correlation detecting means that detects the correlation between the image data obtained by the image capturing and the image data obtained by image capturing of another image pickup apparatus.

The image pickup apparatus further comprises: link processing means that correlates the image data obtained by the image capturing with the image data obtained by the image capturing of the other image pickup apparatus.

The link processing means correlates the correlation between a plurality of pieces of the image data on the basis of additional information added to the image data obtained by the image capturing and to the image data obtained by the image capturing of the other image pickup apparatus.

The image pickup apparatus further comprises: input means that inputs the image data obtained by the image capturing of the other image pickup apparatus to be stored to storing means.

The image pickup apparatus further comprises: image editing means that edits a plurality of pieces of the image data whose correlation is detected by the correlation detecting means on the basis of editing structure data, and sets image data for output.

The image pickup apparatus further comprises: selecting means that selects the editing structure data used for image edition by the image editing means from a plurality of pieces of the editing structure data.

The image editing means determines the layout of a plurality of pieces of the image data whose correlation is detected by the correlation detecting means on the basis of the editing structure data.

An image editing method according to the present invention creates image data for output by using first image data obtained by image capturing of a first image pickup apparatus and second image data obtained by image capturing of a second image pickup apparatus. The image editing method comprises: an editing-structure-data determining step of determining editing-structure-data used for image edition; a correlation detecting step of detecting the correlation between a specific piece of the first image data and a specific piece of the second image data; and an image editing step of editing the first and second image data whose correlation is detected in the correlation detecting step on the basis of editing-structure-data determined in the editing-structure-data determining step, and generating the image data for output.

The image editing method further comprises: a link processing step of correlating the specific piece of the first image data with the specific piece of the second image data.

In the link processing step, the specific piece of the first image data is correlated with the specific piece of the second image data on the basis of additional information (identification information that identifies the individual image pickup apparatuses or a user, image capturing time-information, image capturing positional-information, or identification information of an image capturing target) added to the first image and the second image data.

In the editing-structure-data determining step, one piece of the editing structure data is determined by selecting the editing structure data used for image edition in the image editing step from a plurality of pieces of the editing structure data.

In the image editing step, the layout of the first and second image data is determined on the basis of the editing structure data.

A program according to the present invention enables the execution of processing for creating image data for output by using first image data obtained by image capturing of a first image pickup apparatus and second image data obtained by image capturing of a second image pickup apparatus. The program enables an information processing apparatus to execute the steps of the image editing method.

According to the present invention, as mentioned above, first and second image data captured by a first image pickup apparatus and a second image pickup apparatus are stored in storing means, thereby correlating the images with each other by using identification information of a user or the individual image pickup apparatus and identification information of an image capturing time, an image pickup position, or an image pickup target (event). Further, the images are edited as album images.

DESCRIPTION OF THE PREFERRED EMBODIMENTS

Hereinbelow, an embodiment of the present invention will be described. Herein, a local camera is an image pickup apparatus, e.g., a still camera or a video camera used by a general user, and a common camera is an image pickup apparatus, e.g., a still camera or a video camera forming a system in cooperation with the local camera. A description is given of an example of creating an image album of images captured by an image pickup system comprising the local camera and the common camera in an album creating system according to the embodiment. The description is given in the following order.

[1. Image pickup system comprising common camera and local camera]

[2. Example of album creating system]

<2-1: Structure example of album creating system>

<2-2: Structure of album creating system arranged independently of local/common camera>

<2-3: Structure of album creating system included in local camera>

<2-4: Structure of album creating system included in common camera>

[3. Album creating processing]

[4. Modification and program]

[1. Image Pickup System Comprising Common Camera and Local Camera]

Prior to a description of the album creating system according to the embodiment of the present invention, a description is given of an example of an image pickup system for obtaining images for an album created by the album creating system.

Figure 1:
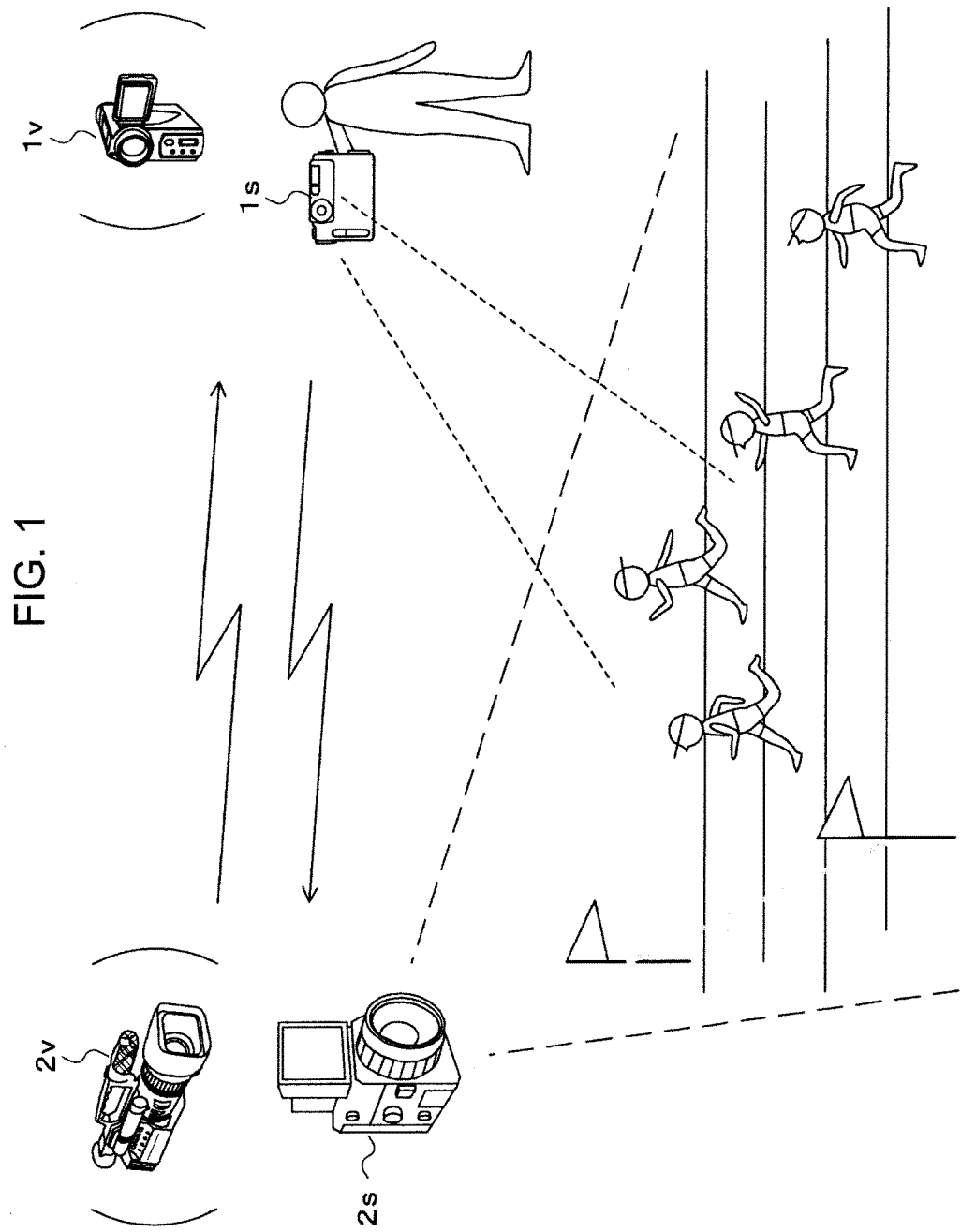
FIG. 1 is an explanatory diagram of an image pickup system according to an embodiment of the present invention.

FIG. 1 shows an example of using the image pickup system according to the embodiment. The image pickup system comprises: a common camera 2, serving as an image pickup apparatus which is arranged at an athletic competition or event place by service providers; and a local camera 1, serving as an image pickup apparatus which captures an image by a user.

The local camera 1 can use a still camera 1s which captures a still image and a video camera 1v which captures a moving image (further having a still-image capturing function).

The common camera 2 can use a still camera 2s which captures a still image and a video camera 2v which captures a moving image (further having a still-image capturing function).

Hereinbelow, when the camera is referred to as the "local camera 1" and the "common camera 2", there is no distinguishment between still and video. However, the "local camera 1s" indicates a still camera and the "local camera 1v" is a video camera. Similarly, the "common camera 2s" indicates the still camera and the "common camera 2v" indicates the video camera.

Referring to FIG. 1, the local camera 1 (1s, 1v) possessed by a user arbitrarily captures images at an athletic competition. For example, the user's child is zoomed-up and the images are captured to follow the child's motion. That is, this image capturing is normally performed by the general user.

Note that a video image captured/recorded by the local camera 1 is referred to a "local image".

The common camera 2 (2s, 2v) is installed at a predetermined position of an athletic competition, e.g., in the school or on the roof top of the school, at which a bird's-eye view of the whole sport on the play ground can be captured. Depending on the common camera 2, e.g., video images of the whole sport are captured. Note that the image captured/recorded by the common camera 2 is referred to a "common image".

In the example, the communication between the local camera 1 and the common camera 2 is possible. Incidentally, as an image pickup system corresponding to an album creating system according to the embodiment, which will be described later, the communication between the local camera 1 and the common camera 2 may not be established.

As an example of communication content, a trigger signal is sent from the local camera 1 to the common camera 2. The local camera 1 captures the local image in accordance with the user's shutter operation, records the local image to a recording medium, and sends the trigger signal.

The common camera 2 captures the common image in accordance with the reception of trigger signal, and records the captured common image to the recording medium.

In this case, a local image of an arbitrary object (e.g., user's child) selected by the user is recorded to the recording medium on the local camera 1 side. Further, a common image of an object (e.g., the whole sport) at the image capturing timing of the local image by the user is recorded to the recording medium on the common camera 2 side.

That is, the image of the user's child at the athletic competition is captured and, for the user, the images of the whole sport at the image capturing timing are captured on the common camera 2 side. Therefore, the user obtains the common image recorded on the common camera 2 side later, thereby obtaining different images (e.g., the whole image and images at different angles) at the shutter timing determined by the user. It is possible to easily obtain various images that are valuable for the user.

Hereinbelow, both the local camera 1 and the common camera 2 are still cameras, and the structure of the image pickup system will be described with reference to FIGS. 2, 3, and 4.

Figure 2:
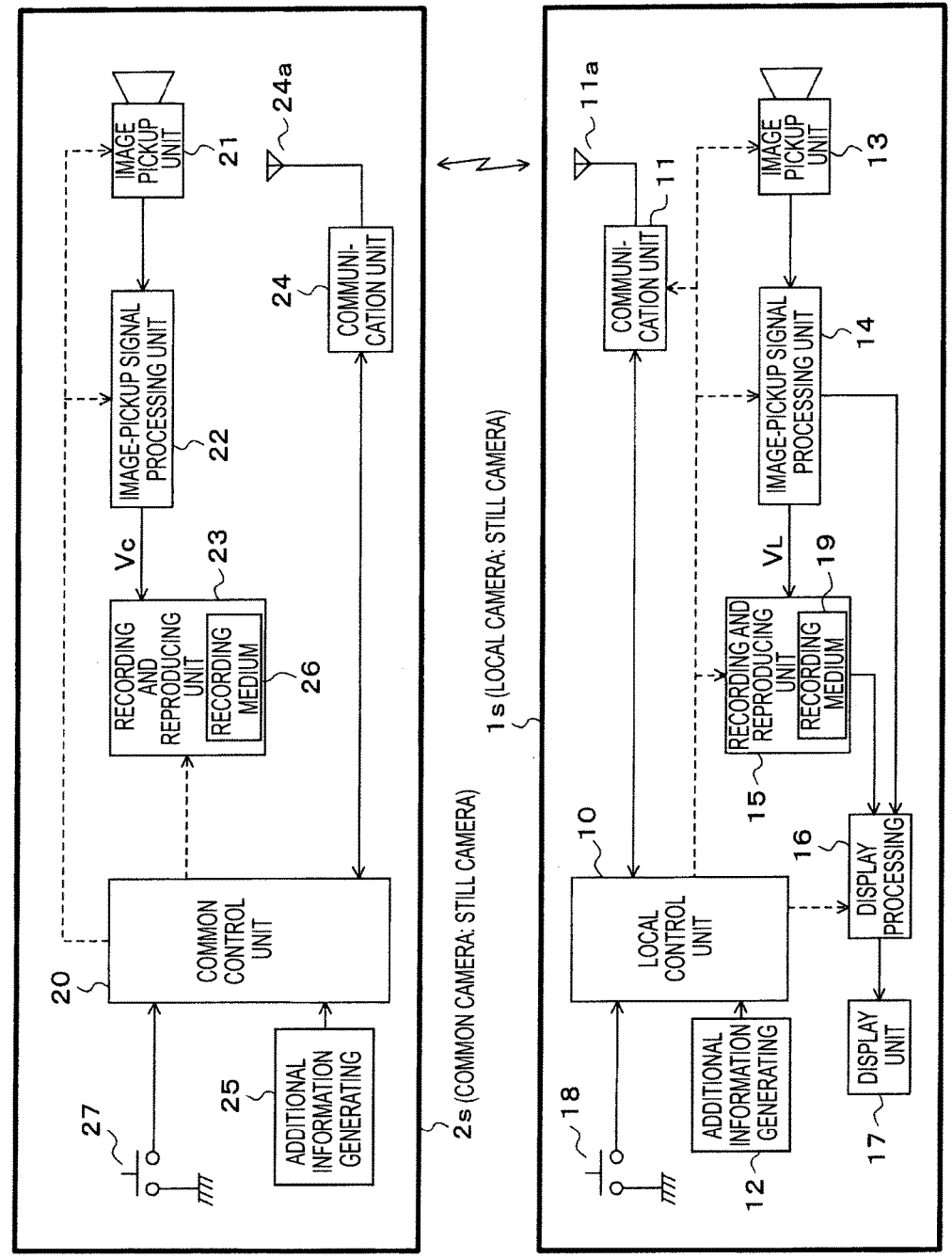
FIG. 2 is a block diagram showing a common camera and a local camera according to the embodiment.

FIG. 2 shows the structure of the local camera 1 (1s) and the common camera 2 (2s).

The local camera 1 comprises: a local control unit 10; a communication unit 11; an antenna 11a, an additional-information generating unit 12; an image pickup unit 13; an image pickup signal processing unit 14; a recording and reproducing unit 15; a display processing unit 16; a display unit 17; and a shutter switch 18. Note that the local camera 1 also comprises normally necessary components (not shown) of a still camera.

The local control unit 10 comprises a micro computer, and controls units in the local camera 1 on the basis of the operation of the user and an operating program stored in an internal memory.

A broken arrow shows the input operation of a control signal to the units by the local control unit 10.

For example, the local control unit 10 instructs necessary operation to the units, in accordance with power operation using an operating device (not shown), zoom operation, display mode operation, reproducing operation, and shutter operation from the shutter switch 18.

The image pickup unit 13 comprises a lens system comprising an image pickup lens, a zoom lens, and a stop; and a driving system for enabling the focus operation and the zoom operation of the lens system. The image pickup unit 13 detects image pickup light obtained by the lens system, and comprises, as an image pickup element for generating an image pickup signal by photoelectrical conversion, a CCD (Charge Coupled Device) sensor array or a CMOS sensor array. Further, the image pickup unit 13 comprises: vertical and horizontal scanning circuits for reading pixel signals from the image pickup element; a sample holding/AGC (Automatic Gain Control) circuit for controlling the gain of a signal read from the image pickup element and for shaping the waveform of the signal; and an A/D converter. The image pickup unit 13 outputs digital image data, as an image signal obtained by capturing an image of the object with the above-mentioned structure.

The local control unit 10 controls the reading operation of the image pickup signal, focus/zoom driving-system operation, and signal processing of the image pickup unit 13 in accordance with the user operation.

The image pickup signal processing unit 14 performs various signal processing of the image pickup signal output from the image pickup unit 13. For example, the image pickup signal processing unit 14 performs white-balance adjustment, clamping processing, correcting processing, luminance processing, and color-difference processing.

Further, after compressing and encoding processing and formatting processing of the image pickup signal, the recording and reproducing unit 15 generates an image signal (local image VL) to be recorded to a recording medium 19 and an image signal to be displayed on the display unit 17.

The compressing and encoding processing includes, e.g., processing based on JPEG (Joint Photographic Experts Group) system for still image, MPEG (Moving Picture Experts Group) system for moving image, and another compressing system.

In this case, the local camera 1 is a still camera and, therefore, the image pickup signal processing unit 14 supplies, to the recording and reproducing unit 15, the timing based on the control operation of the local control unit 10, i.e., an image signal of a frame at the pressing timing of the shutter switch 18 from among moving image signals (image signals of continuous frames) obtained by the image pickup unit 13.

During the searching and focusing time of the object by the user, the user confirms the object on the display unit 17, e.g., a view finder or a liquid crystal panel. Therefore, the image pickup signal processing unit 14 supplies the image signal, as a moving image, to the display processing unit 16.

The recording and reproducing unit 15 performs the processing for recording the local image VL from the image pickup signal processing unit 14 to the recording medium 19 under the control operation of the local control unit 10. The captured image is recorded in accordance with the shutter operation of the user. In accordance with the user's pressing operation of the shutter switch 18, the local control unit 10 allows the recording and reproducing unit 15 to execute the recording of the local image VL to the recording medium 19.

The recording medium 19 may be a mobile recording medium, e.g., a detachable memory card including a solid memory, an optical disk, a magneto-optical disk, a magnetic disk, or a magnetic tape, or a recording medium, e.g., a built-in solid memory or a hard disk (HDD), fixedly-arranged to the apparatus.

The recording and reproducing unit 15 comprises a mechanism and a circuit which record or reproduce the local image VL and information in association therewith in accordance with the type of medium used, as the recording medium 19, to the recording medium 19.

For example, if the recording medium 19 is a disk recording medium, the recording and reproducing unit 15 comprises, e.g., an insert/exit mechanism to/from a disk medium 90, a recording and reproducing head, a driving system, such as a spindle motor, and a servo system. If the recording medium 19 is a medium, such as a memory card, the recording and reproducing unit 15 comprises a connection mechanism (card slot) to a memory card and an access and interface circuit system.

The recording and reproducing unit 15 reproduces the local image VL recorded to the recording medium 19 under the control operation of the local control unit 10. The reproduced local image VL is supplied to the display processing unit 16.

The display processing unit 16 performs decoding processing for a recording format, error correcting processing, and compressing/decompressing processing of the reproduced local image VL, and further performs, for display operation, luminance/color signal processing, RGB processing, and gain adjustment, and supplies the processed signal to the display unit 17.

The display unit 17 is a display unit which is arranged with the local camera 1s in a view finder system or a liquid crystal panel system, and monitors the object which is being captured by the user and the reproduced video image.

When the local camera 1 is in an image pickup mode, the moving image data of the object from the image pickup signal processing unit 14 is processed by the display processing unit 16, and is displayed on the display unit 17.

When the local camera 1 is in a reproducing mode, data on the still image reproduced by the recording and reproducing unit 15 is processed by the display processing unit 16, and is displayed on the display unit 17.

The communication unit 11 and the antenna 11a send the data in a wireless manner to an external device, particularly to the common camera 2 under the control operation of the local control unit 10. For example, the local control unit 10 allows the communication unit 11 to send a trigger signal.

Although not shown, the local camera 1 comprises an external personal computer, an audio/video device, and various interfaces to another device, and it is considered that the local camera 1 can input and output the image data and other various data.

The common camera 2 comprises: a common control unit 20; an image pickup unit 21; an image pickup signal processing unit 22; a recording and reproducing unit 23; a communication unit 24; an antenna 24a; an additional-information generating unit 25; and a shutter switch 27.

Note that the common camera 2 needs the portions corresponding to characteristic operation in the example, which will be described later. Further, although not shown, in addition to this, the common camera 2 comprises a monitor display unit and an operating unit generally-arranged in the still image and another necessary component.

The common control unit 20 comprises a micro computer, and controls units in the common camera 2 on the basis of an operating unit (not shown), operation of the shutter switch 27, or an operating program stored in an inner memory. A broken arrow shows the input operation of a control signal to the units by the common control unit 20.

For example, the common control unit 20 instructs necessary operation to the units in accordance with power operation based on the operation, zoom operation, display mode operation, reproducing operation, and shutter operation.

The image pickup unit 21 comprises a lens system comprising an image pickup lens, a zoom lens, and a stop; and a driving system for enabling the focus operation and the zoom operation of the lens system. Further, the image pickup unit 21 detects image pickup light obtained by the lens system, and comprises, as an image pickup element for generating an image pickup signal by photoelectrical conversion, a CCD (Charge Coupled Device) sensor array or a CMOS sensor array. Furthermore, the image pickup unit 13 comprises: vertical and horizontal scanning circuits for reading pixel signals from the image pickup element; a sample holding/AGC (Automatic Gain Control) circuit for controlling the gain of a signal read from the image pickup element and for shaping the waveform of the signal; and an A/D converter. The image pickup unit 21 outputs digital image data, as an image signal obtained by capturing an image of the object with the above-mentioned structure.

The common control unit 20 controls the reading operation of the image pickup signal, focus/zoom driving-system operation, and signal processing of the image pickup unit 21 in accordance with the user operation.

The image pickup signal processing unit 22 performs various signal processing of the image pickup signal output from the image pickup unit 21. For example, the image pickup signal processing unit 22 performs white-balance adjustment, clamping processing, correcting processing, luminance processing, and color-difference processing.

Further, after compressing and encoding processing and formatting processing of the image pickup signal, the recording and reproducing unit 23 generates an image signal (common image Vc) to be recorded to a recording medium 26 and an image signal to be displayed on a display unit (not shown).

The compressing and encoding processing includes, e.g., processing based on JPEG (Joint Photographic Experts Group) system for still image, MPEG (Moving Picture Experts Group) system for moving image, and another compressing system.

In this case, the common camera 2 is a still camera and, therefore, the image pickup signal processing unit 22 supplies, to the recording and reproducing unit 23, image signals of a frame at the timing based on the control operation of the common control unit 20 from among moving image signals (image signals of continuous frames) obtained by the image pickup unit 21. As will be described later in accordance with FIG. 3, on the common camera 2 side, the common control unit 20 uses the sending timing of the trigger signal from the local camera 1, as a shutter timing, and controls the image pickup signal processing unit 22.

Note that the image pickup signal processing unit 22 supplies an image signal, as a moving image, to a display processing system of a display unit (not shown), such as a view finder or a liquid crystal panel, so as to monitor the situation of the object.

The recording and reproducing unit 23 performs the processing for recording the common image Vc from the image pickup signal processing unit 22 to the recording medium 26 under the control operation of the common control unit 20. The captured image is recorded in accordance with the operation of the shutter switch 27 or the reception of the trigger signal. In accordance with the user's pressing operation of the shutter switch 27 or the reception of the trigger signal, the common control unit 20 allows the recording and reproducing unit 23 to execute the recording of the common image Vc to the recording medium 26.

Similarly to the local camera 1, the recording medium 26 may be a mobile recording medium, e.g., a detachable memory card including a solid memory, an optical disk, a magneto-optical disk, a magnetic disk, and a magnetic tape, or a recording medium, e.g., a built-in solid memory and a hard disk (HDD), fixedly-arranged to the apparatus.

The recording and reproducing unit 23 comprises a mechanism and a circuit which record or reproduce the common image Vc and information in association therewith in accordance with the type of medium used, as the recording medium 26, to the recording medium 26.

Further, the recording and reproducing unit 23 supplies the image reproduced from the recording medium 26 to a display processing system so as to display the image on a display unit (not shown).

The communication unit 24 and the antenna 24a can receive the data sent in a wireless manner from the local camera 1. For example, the local camera 1 sends the trigger signal, and the communication unit 24 and the antenna 24a receive the sent signal and supply the signal to the common control unit 20.

Note that the common camera 2 comprises an external personal computer, an audio/video device, and various interfaces to another device, and it is considered that the common camera 1 can input and output the image data and other various data.

Figure 3:
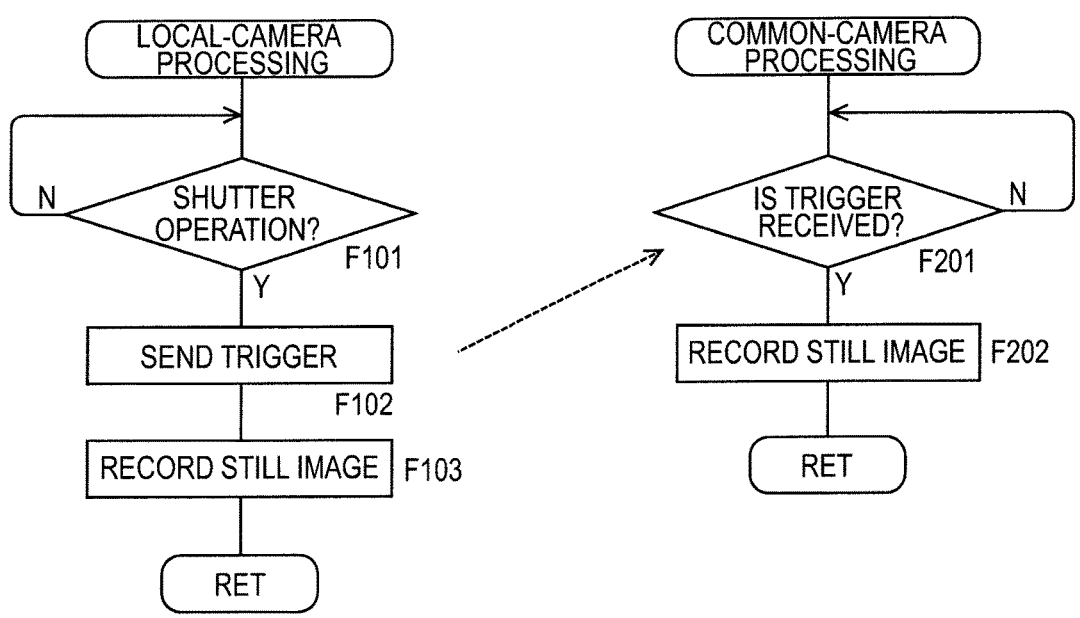
FIG. 3 is a flowchart of processing the common camera and the local camera according to the embodiment.

A description is given of the operation executed by the local camera 1 and the common camera 2 with reference to FIG. 3.

FIG. 3 shows the processing for recording the captured image, as the processing of the local control unit 10 and the common control unit 20. Note that the processing shown in FIG. 3 is performed when both the local camera 1 and the common camera 2 are turned on and capture the images of the object (displayed on the monitor) in the image pickup mode (i.e., standby mode of the shutter timing).

The local control unit 10 detects the operation of the shutter switch 18 by the user in step F101 and, then, allows the communication unit 11 to send the trigger signal in step F102.

Simultaneously, in step F103, the local control unit 10 controls the recording of a still image. That is, the local control unit 10 controls the image pickup signal processing unit 14 and the recording and reproducing unit 15 to execute the recording the captured image (local image VL) at the shutter timing.

The common control unit 20 monitors the reception of the trigger signal by the communication unit 24 in step F201. When the common control unit 20 receives the trigger signal, the common control unit 20 controls the recording of still image in step F202. That is, the common control unit 20 controls the image pickup signal processing unit 22 and the recording and reproducing unit 23 to execute the recording of the captured image (common image Vc) at the receiving timing of the trigger signal.

As a consequence of the above-mentioned processing, the user performs the shutter operation of the local camera 1, thereby capturing and recording the image by the common camera 2 at the same timing. That is, both the local camera 1 and the common camera 2 capture and record the image at the same timing.

It is assumed that the user sets his/her child, as an object, at an athletic competition, and the shutter operation of the local camera 1 is performed at one timing. Further, it is assumed that the whole athletic competition is set, as an object, on the common camera 2 side.

Figure 4:
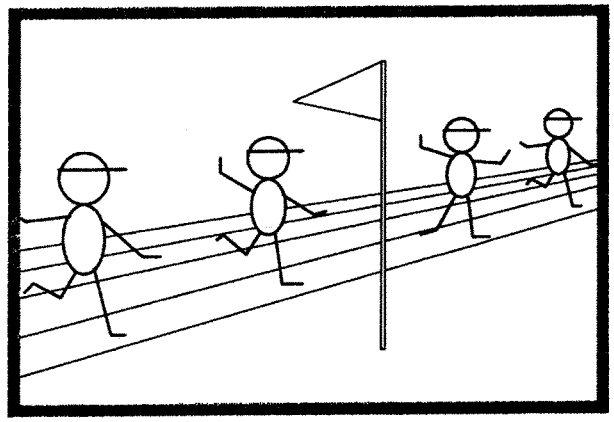
FIG. 4 is an explanatory diagram of images captured by the common camera and the local camera according to the embodiment.
Figure 4:
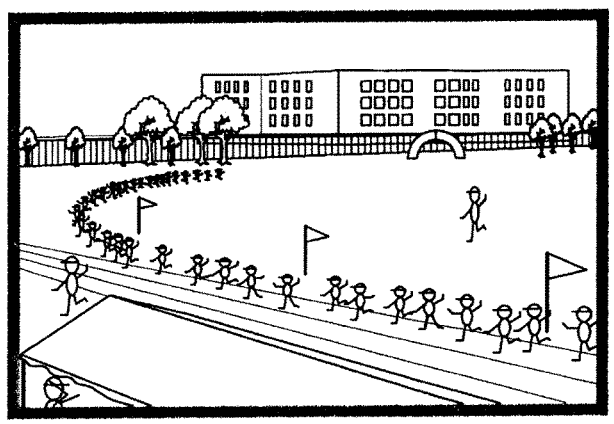

In this case, e.g., when the local camera 1 captures/records the local image VL as shown in FIG. 4(*a*), the user allows the common camera 2 to record, as the common image Vc, the whole scene of the sport shown in FIG. 4(*b*) in accordance with the trigger signal at the image capturing timing.

That is, the local camera 1 captures/records, as the local image VL, the image of the scene privately-selected by the user, and the common camera 2 captures/records, as the common image Vc, the image of the whole scene at the same timing as that of the local image VL.

FIGS. 4(*c*) and 4(*d*) show the recording states of the recording medium 19 in the recording and reproducing unit 15 on the local camera 1 side and of the recording medium 26 by using the recording and reproducing unit 23 on the common camera 2 side. For example, referring to FIG. 4(*c*), the user of the local camera 1 performs the shutter operation at an arbitrary timing, thereby recording local images VL1, VL2, and VL3 to the recording medium 19.

In this case, on the common camera 2 side, the recording medium 26 records common images Vc1, Vc2, and Vc3. The common images Vc1, Vc2, and Vc3 become the images at the same timings of those of the local images VL1, VL2, and VL3, respectively.

In the operation example, e.g., only by performing the shutter operation at an arbitrary timing by the user and recording the captured image with the local camera 1, the common camera 2 records the image of the object selected by the common camera 2, e.g., another image at the same timing including the image of the whole scene, and the image at a different angle.

After that, the user obtains an album obtained by combining the local image VL recorded by the local camera 1 and the common image Vc recorded by the common camera 2 with an album creating system, which will be described later. Thus, the user can obtain various images with a feeling of satisfaction.

Although one example of the image pickup system is described for the purpose of easily understanding the operation of the album creating system, which will be described later, various examples of a plurality of image pickup apparatuses used for the album creating system are considered.

For example, with the trigger signal to the common camera 2 at the shutter timing from the local camera 1 as mentioned above, the images can be synchronously captured by the cameras. On the contrary, it is considered that the common camera 2 sends the trigger signal to the local camera 1. For example, at an attraction of an event or a theme park, a service provider can grasp a proper shutter-timing in advance.

In such a case, the common camera 2 captures/records the image at a proper timing, and sends the trigger signal to the local camera 1. The local camera 1 captures/records the image in accordance with the trigger signal. Then, the whole common image and the local image arbitrarily-selected by the user are obtained at a proper shutter-timing.

In the case of creating the album with the album creating system according to the embodiment, it is preferable that the local camera 1 and the common camera 2 may synchronously capture the image. Then, the image pickup system that synchronously captures the images in accordance with the trigger signal is preferable.

On the other hand, an image pickup system may not synchronously capture the images in accordance with the trigger signal. For example, the common camera 2, as the video camera 2*v*, always captures a moving image. Then, a still image at the same time as that of the image data VL captured by the local camera 1 can be extracted as one frame of the moving image data. Alternatively, the moving image near the time can be obtained.

Even when the common camera 2 is the still camera 2*s*, the common camera 2 always captures the image at the interval of a predetermined time. In such a case, it is possible to obtain the captured image data at the same time as that of the captured image data of the local camera 1.

Depending on cases, the synchronous image-capturing is not necessarily considered. For example, preferably, images captured with the local cameras 1 by a plurality of general users are collected, as an album, later. In such a case, image data is correlated with each other by an image capturing target or place, thereby properly editing the album.

In any case, with the album creating system according to the embodiment, the image data obtained by a plurality of image pickup apparatuses is correlated (linked) with each other, thereby creating the album. In other words, a plurality of image pickup apparatuses may obtain image data which can be correlated (linked) with each other. In the example of the trigger signal, the captured image data at the same time is obtained upon using the time for linking the image data.

Obviously, a plurality of image pickup apparatuses may be three or more image pickup apparatuses. Or, a plurality of image pickup apparatuses may not include the local camera 1 used by the general user and the common camera 2 used by the service provider.

Further, preferably, as information for correlating (linking) the image data with each other in the album creation, additional information ML and Mc may be linked to the image data VL and Vc and, then, the image data may be recorded as shown in FIGS. 4(*c*) and 4(*d*). For example, in the local camera 1, the additional information generating unit 12 generates the additional information ML at the image capturing timing, and the local control unit 10 controls the recording and reproducing unit 15 to record the additional information ML linked to the captured image data VL to the recording medium 19.

For example, in the common camera 2, the additional information generating unit 25 generates the additional information Mc at the image capturing timing, and the common control unit 20 controls the recording and reproducing unit 23 to record the additional information Mc linked to the captured image data Vc to the recording medium 26.

For example, the additional information generating units 12 and 25 are timer units, GPS receiving units, user information memories, identification-information memories, image-capturing target identification information memories, text data memories, and the like. Therefore, the additional information ML is, e.g., image-capturing time information, GPS positional information, user ID, user private information, device ID, image capturing-event identification code, text data, and the like.

Further, the additional information may be sent and recorded to another image pickup apparatus. For example, in the case of capturing the image by the local camera 1, the additional information, such as a user ID or a device ID, may be sent to the common camera 2 together with the trigger signal, and the sent additional information linked to the common image Vc captured by the common camera 2 may be recorded.

Based on the foregoing, preferable examples of the image pickup system are given in consideration of the album creating system according to the embodiment.

Examples of a plurality of image pickup apparatuses (cameras A and B) as image pickup system.

Common camera having one camera A and local camera having one camera B.
  Common camera having one camera A and local camera having a plurality of cameras B.
  Common camera having a plurality of cameras A and local camera having one camera B.
  Common camera having a plurality of cameras A and local camera having a plurality of cameras B.
  Local camera having one camera A and common camera having one camera B.
  Local camera having one camera A and common camera having a plurality of cameras B.
  Local camera having a plurality of cameras A and common camera having one camera B.
  Local camera having a plurality of cameras A and common camera having a plurality of cameras B.
  Common camera having one or a plurality of cameras A and common camera having one or a plurality of cameras B.
  Local camera having one or a plurality of cameras A and local camera having one or a plurality of cameras B.

Examples of image capturing of a plurality of image pickup apparatuses (cameras A and B).

Upon starting the capturing of a still image or a moving image of the camera A, the camera B also starts the capturing of a still image or a moving image in accordance with the trigger signal from the camera A.
  The camera A captures a still image or a moving image at an arbitrary timing, and the camera B captures a still image or a moving image at an arbitrary timing.
  The camera A captures a still image or a moving image at an arbitrary timing, and the camera B captures a still image every predetermined time or always captures a moving image.

Examples of communication between a plurality of image pickup apparatuses (cameras A and B).

Wireless communication is not performed between the cameras A and B.
  Communication of the trigger signal is performed between the cameras A and B in one direction or interactive direction.
  Communication of the additional information is performed between the cameras A and B in one direction or interactive direction.
  Communication of image data (captured image or thumbnail image) is performed between the cameras A and B in one direction or interactive direction.

Recording examples of additional information by a plurality of image pickup apparatuses (the cameras A and B).

One of the cameras A and B or both of them record the additional information generated in the apparatus together with the captured image data.
  One of the cameras A and B or both of them record the additional information sent from the camera at the communication destination together with the captured image data.
  One of the cameras A and B or both of them record the additional information generated in the apparatus and the additional information sent from the camera at the communication destination together with the captured image data.

The image pickup system can be formed by combining all the examples. In the album creating system according to the embodiment, the album is created by using the image data captured by a plurality of image pickup apparatuses. Therefore, a corresponding image pickup system may have a plurality of image pickup apparatuses and may obtain information for correlating the image data of the image pickup apparatuses with each other in the album creation.

[2. Examples of Album Creating System]

<2-1: Structure Example of Album Creating System>

Hereinbelow, a description is given of the album creating system according to the embodiment.

Note that various image pickup systems for obtaining the image data for operation of the album creating system exist as mentioned above. For the purpose of a brief description, an image pickup system comprising the local camera 1 and the common camera 2 is assumed. Incidentally, the following description based on the assumption can be applied to the image pickup systems obtained by combining all the examples as well as the image pickup system comprising one the local camera 1 and one common camera 2.

Figure 5:
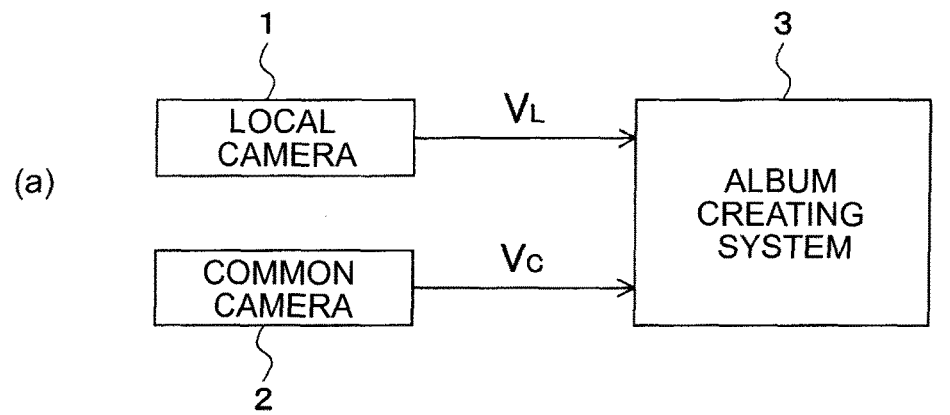
FIG. 5 is an explanatory diagram showing a structure example of an album creating system according to the embodiment.
Figure 5:
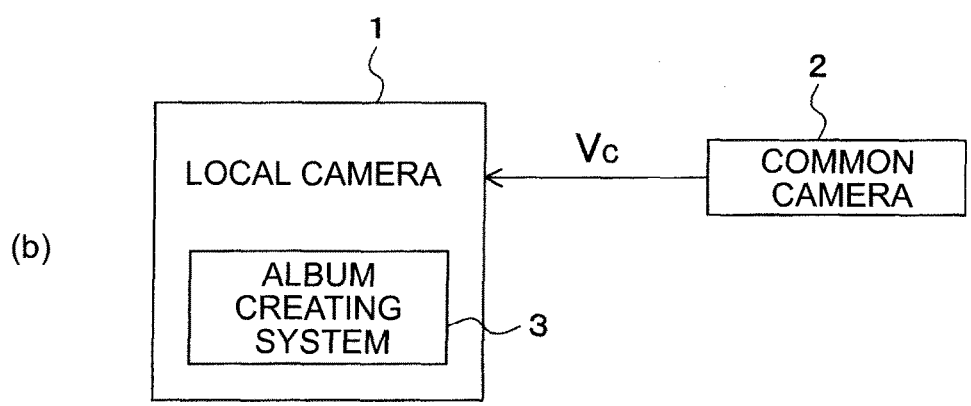
Figure 5:
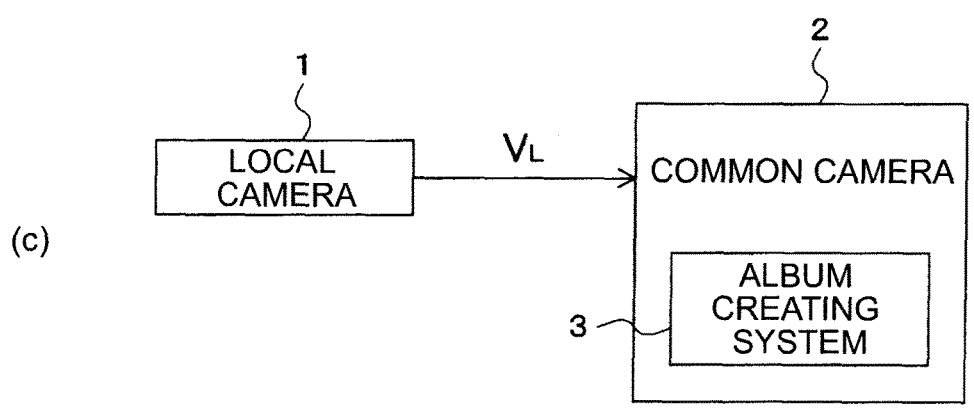

In the case of assuming the image pickup system comprising the local camera 1 and the common camera 2, an album creating system is as shown in FIGS. 5(*a*), 5(*b*), and 5(*c*).

FIG. 5(*a*) shows the case of forming an album creating system 3, independently of the local camera 1 and the common camera 2.

The album creating system 3 is possessed by, e.g., a service provider or a general user, and may be a dedicated system, as an album creating system, or may perform the album creation on a software program on a hardware resource of a general information processing system of a personal computer system. In the case of capturing the image to the album creating system, a removable medium that records the image is inserted to the dedicated device or the personal computer, thereby capturing the image to the dedicated device or the personal computer. Alternatively, the local camera 1 or the common camera 2 sends the image in a wireless manner, thereby capturing the image to the dedicated device or the personal computer.

In this case, the album creating system 3 inputs the image data (local image VL) captured by the local camera 1 and the image data (common image Vc) captured by the common camera 2. The album creating system 3 correlates the input image data in predetermined link processing (or detects the correlation), and creates album structure data on the basis of the album structure data for designating the editing format.

FIG. 5(*b*) shows the case in which the album creating system 3 is included in the local camera 1. The operation of the album creating system 3 is executed by calculating processing using the hardware resource in the local camera 1. Obviously, the album creating system 3 is not included in the local camera 1 and the album creating system 3 may perform the album creating operation on software of a personal computer of a possessor of the local camera 1. That is, a removable medium that records the image by using the local camera 1 may be inserted to the personal computer or the wireless communication may be performed, thereby capturing the image of the possessor of the local camera 1.

In this case, the local camera 1 inputs the image data (common image Vc) captured by the common camera 2. The album creating system 3 correlates the image data (local image VL) captured by the local camera 1 with the input image data (common image Vc) in predetermined link processing (or detects the correlation therebetween), and creates the album structure data on the basis of the album structure data for designating the editing format.

FIG. 5(c) shows the case in which the album creating system 3 is included in the common camera 2. The operation of the album creating system 3 is executed by calculating processing using the hardware resource in the common camera 2. Obviously, the album creating system 3 is not included in the common camera 2 and the album creating system 3 may perform the album creating operation on software of the personal computer of the possessor of the common camera 2. That is, a removable medium that records the image by using the common camera 2 may be inserted in the personal computer, or the wireless communication may be performed, thereby capturing the image to the personal computer of the possessor of the common camera 2.

In this case, the common camera 2 inputs the image data (local image VL) captured by the local camera 1. The album creating system 3 correlates the image data (common image Vc) captured by the common camera 2 with the input image data (local image VL) (or detects the correlation therebetween) in predetermined link processing, thereby creating the album structure data on the basis of the album structure data for designating the editing format.

<2-2: Structure of Album Creating System Independent of Local/Common Cameras>

Figure 6:
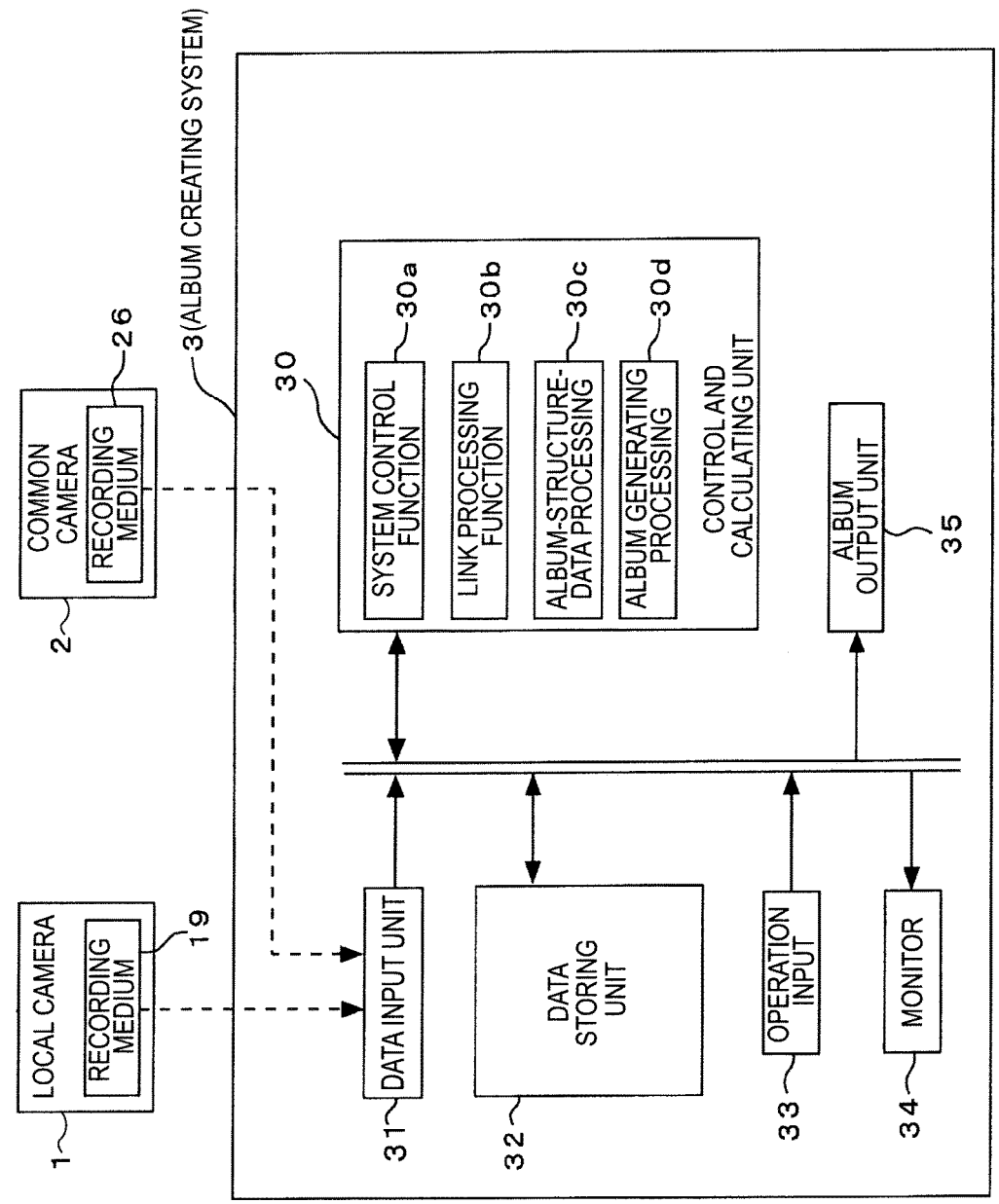
FIG. 6 is a block diagram showing the album creating system according to the embodiment.

FIG. 6 shows a structure example in which the album creating system comprises a device (personal computer, etc.) independent of the local camera 1 and the common camera 2 as shown in FIG. 5(a).

Referring to FIG. 6, the album creating system 3 comprises: a control and calculating unit 30; a data input unit 31; a data storing unit 32; an operation input unit 33; a monitor unit 34; and an album output unit 35.

The data input unit 31 inputs the image data VL and Vc from the local camera 1 and the common camera 2 and the additional information ML and Mc.

As will be described later, the control and calculating unit 30 performs image editing processing on the basis of the album structure data. The album structure data may be externally created and may be input from the data input unit 31. Alternatively, the data input unit 31 may input information for designating one of a plurality of pieces of the album structure data prepared in the album creating system 3.

Specifically, the data input unit 31 is a medium driving device unit, a wireless communication device unit, or a network communication device unit.

When the recording medium 19 in the local camera 1 and the recording medium 26 in the common camera 2 are, e.g., mobile recording media, data in the recording media 19 and 27 is reproduced by the album creating system 3, thereby capturing the recorded local image VL and common image Vc. Obviously, when the recording medium 19 records the additional information ML corresponding to the local image VL or the recording medium 26 records the additional information Mc corresponding to the common image Vc, the recorded information can be captured. Therefore, the data input unit 31 may be a medium driving device unit, such as a disk drive, a tape drive, and a memory card slot, corresponding to the type of the recording medium 26.

When the local camera 1 sends and outputs the local image VL and the additional information ML recorded to the recording medium 19 from the communication unit 11, the data input unit 31 may be a wireless communication device that can receive the data sent from the communication unit 11. When the common camera 2 sends and outputs the local image Vc and the additional information Mc recorded to the recording medium 26 from the communication unit 24, the above description can be used.

Further, LAN (Local Area Network) connection between the local camera 1 and the common camera 2 or the connection via a public network, such as the Internet, is assumed and the data input unit 31 is a network communication device unit and, then, the local image VL, the common image Vc, and the additional information ML and Mc can be input.

The data storing unit 32 stores various data for creating the album. Specifically, the data storing unit 32 is realized as an HDD (Hard Disk Drive) or a disk drive of a recording medium including various optical disk media, such as a CD recording medium, a DVD recording medium, and a Blu-Ray Disc. Obviously, the data storing unit 32 may be a solid memory unit.

The data storing unit 32 stores at least the local image VL and the common image Vc. That is, the local image VL and the common image Vc input from the data input unit 31 are recorded to the data storing unit 32. Further, the additional information ML and Mc is stored in the data storing unit 32 together with the local image VL and the common image Vc.

Figure 7:
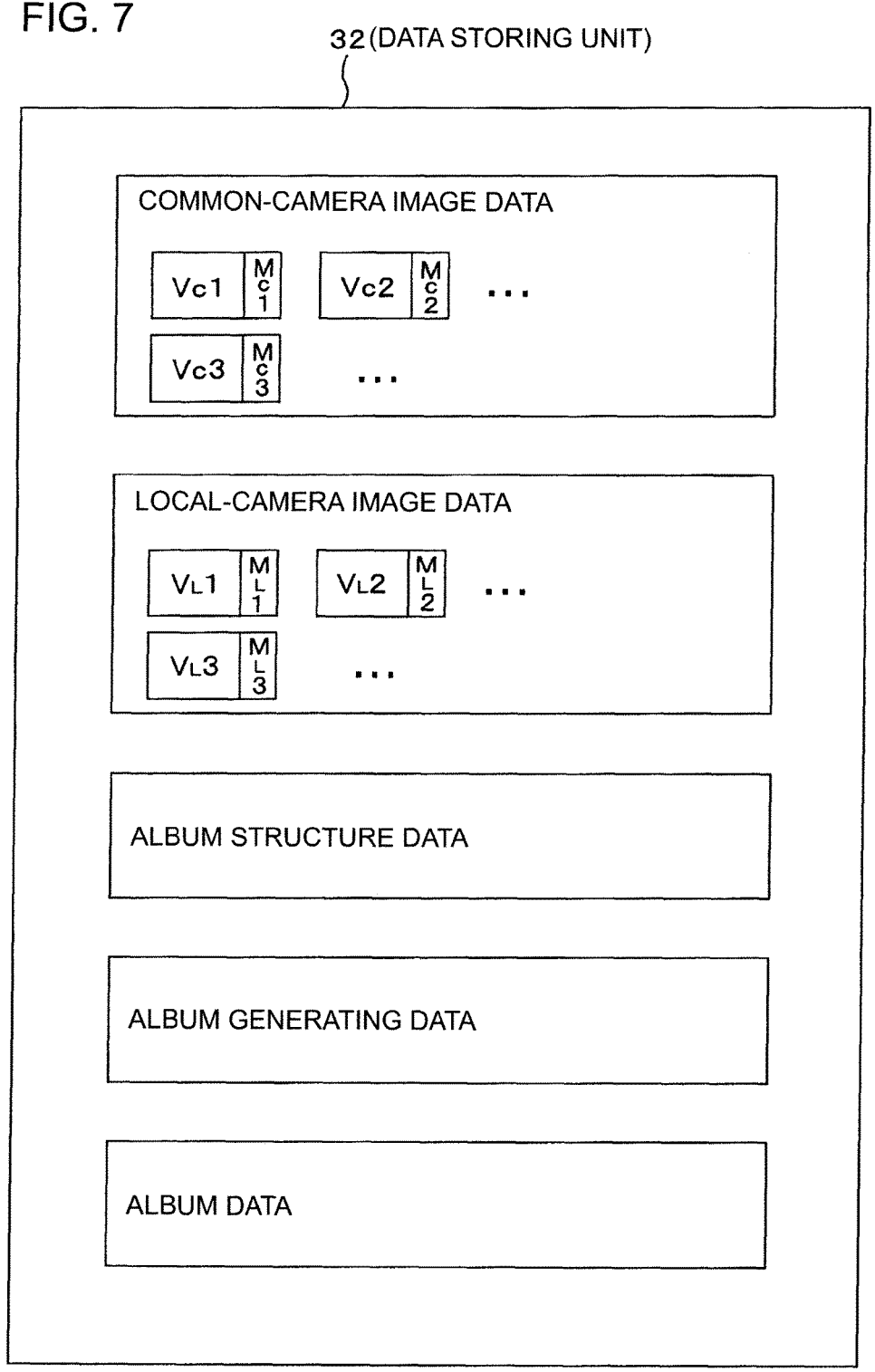
FIG. 7 is an explanatory diagram of a data storing unit in the album creating system according to the embodiment.

FIG. 7 schematically shows the data stored in the data storing unit 32.

First, an area for storing the common image Vc supplied from the common camera 2 is arranged. That is, the common images Vc1, Vc2, Vc3 . . . are stored together with corresponding additional information Mc1, Mc2, Mc3 . . . .

An area for storing the local image VL supplied from the local camera 1 is arranged. That is, the local images VL1, VL2, and VL3 . . . are stored together with corresponding additional information ML1, ML2, and ML3 . . . .

In addition to those, the data storing unit 32 has an area for storing the album structure data. The area stores the album structure data created in the album creating system 3 and the album structure data that is created by an external device and the album structure data input from the data input unit 31.

Further, the data storing unit 32 has an area for storing album generating data. The area stores the album generating data that is generated during album generating processing of the control and calculating unit 30, which will be described later.

The data storing unit 32 has an area for storing the album data. The area stores the album data created by the control and calculating unit 30 in album generating processing, which will be described later, i.e., data output as an album.

The operation input unit 33 is an input unit that is used for various operations by a user of the album creating system 3 (stuff of the service provider and the general user), and is prepared in accordance with the form of the device. For example, the operation input unit 33 can be a keyboard, a mouse, a panel switch on the device, a remote commander, a pointer, or a touch panel.

The monitor unit 34 is a monitor display device unit that confirms a menu screen operated by the user of the album creating system 3, various setting content for creating the album, content reference in the selection, process of album creating processing, or completed album data.

The album output unit 35 is a device unit that outputs the album data created by the album creating system 3.

For example, in a system for printing out the album on the basis of the album data, the album output unit comprises an interface to a printing device. In this case, the album data stored in the data storing unit 32 is output to a printing device from the album output unit 35 under the control operation of the control and calculating unit 30, and the album made of a sheet is generated by printing.

The album output unit 35 may be a sending unit that communicates data via a network communication network, such as a LAN or Internet. Further, the album output unit 35 may be a communication unit for wireless transmission. Note that the album output unit 35 is shared with the data input unit 31 as the hardware structure in these cases.

In the case of using wire or wireless network communication or a wireless communication unit with a predetermined communication device, the album data stored in the data storing unit 32 is sent and is output from the album output unit 35 under the control operation of the control and calculating unit 30. The receiving device side outputs display data and prints out data on the basis of the album data.

The album output unit 35 is a recording device unit of a recording medium, such as a mobile disk or memory card. In such a case, the album data stored in the data storing unit 32 is written to a disk or the like by the album output unit 35 under the control operation of the control and calculating unit 30. The data of the disk is reproduced and the user thus views the album image.

The album output unit 35 may be an output unit that uploads the album data to a network server. Alternatively, the album output unit 35 may be an uploading communication unit to a website in a predetermined server system, or the album creating system 3 may have a function of a server system. In this case, the user accesses a website provided by the server, thereby viewing the created album image.

Note that the album output unit 35 may output link information to the album data or access information, without outputting the album data. For example, the service provider stores, to the data storing unit 32, the album data created by the album creating system 3. When the data storing unit 32 is a data storing unit of the server system, the link information is sent to the general user. The general user accesses the album data by the link information, and views the album data.

The control and calculating unit 30 is a micro computer having, e.g., a CPU, a ROM, a RAM, and a nonvolatile memory, and performs various calculating processing for the entire control operation and the album creating processing of the album creating system 3. Necessary operation function is shown in the drawing.

A system control function 30*a* controls data input processing of the data input unit 31, data writing/reading to/from the data storing unit 32, detection of operation input from the operation input unit 33 and corresponding processing thereof, display and output on the monitor unit 34, and output of the album data from the album output unit 35.

A link processing function 30*b* correlates the local image VL stored in the data storing unit 32 with the common image Vc, and performs the creation of the album generating data.

An album-structure-data processing function 30*c* creates the album structure data used for album creation, and performs determining processing of the album structure data in accordance with the selection and input of the album structure data.

The album structure data is obtained by collecting basic information for album structure including image layout in the album, background image, front-page setting, the number of images, the number of album pages, a condition for correlating the local image VL with the common image Vc, a moving image or a still image.

An album generating processing function 30*d* edits the image of the album generating data generated by the link processing function 30*b* on the basis of the album structure data, thereby generating the album data.

Although the album generating processing will be described later, the above-mentioned album creating system 3 generates the album data by using the image data captured by the local camera 1 and the common camera 2.

Note that examples realized by the units shown in FIG. 6 are varied and, therefore, the examples are shown here.

Input examples of image data to album creating system 3.
  The image data VL and Vc is input in wireless communication from the local camera 1 and the common camera 2.
  The image data VL and Vc is input in wire or wireless network communication from the local camera 1 and the common camera 2.
  The image data VL and Vc is inputted by reproducing the data in the recording media 19 and 27 used by the local camera 1 and the common camera 2.
  The image data VL of the local camera 1 is input in one of the above three forms, and the image data Vc of the common camera 2 is input in one of the remaining two forms.

Input example of additional information.
  The additional information is input together with the image data from both the local camera 1 and the common camera 2 or from one of them.
  The additional information is input together with identification information (e.g., image data file-name) of the corresponding image data from both the local camera 1 and the common camera 2 or from one of them in the form different from that of the image data.

Album structure data.
  Single or a plurality of pieces of the album structure data are created by the album-structure-data processing function 30*c*, and are stored in the data storing unit 32.
  Single or a plurality of pieces of the album structure data are created by an external device (local camera 1 or common camera 2, or another device), are input from the data input unit 31, and are stored in the data storing unit 32.
  Single or a plurality of pieces of the album structure data are created in advance, and are stored in the data storing unit 32 as preset data.

Selection of album structure data.
  The album structure data used for album creating processing is selected by the input from the operation input unit 33.
  Information for designating the album structure data used for the album creating processing is output from the external device (local camera 1 or common camera 2, or another device), and is input from the data input unit 31.
  The information for designating the album structure data from the local camera 1 or the common camera 2, serving as the external device, is included in the additional information ML or Mc.

The information for designating the album structure data from the external device is supplied independently of the additional information.

The album structure data is automatically selected by the album-structure-data processing function 30c.

Output form of album data.

The album data is output as printing data.

The album data is sent and is output to the external device in a predetermined mutual communication function.

The album data is sent and is output to the external device in the network communication function.

The album data is uploaded to the network server (website).

The album data is not output, and link information of the album data is output in one of the above forms.

<2-3: Structure of Album Creating System Included in Local Camera>

Figure 8:
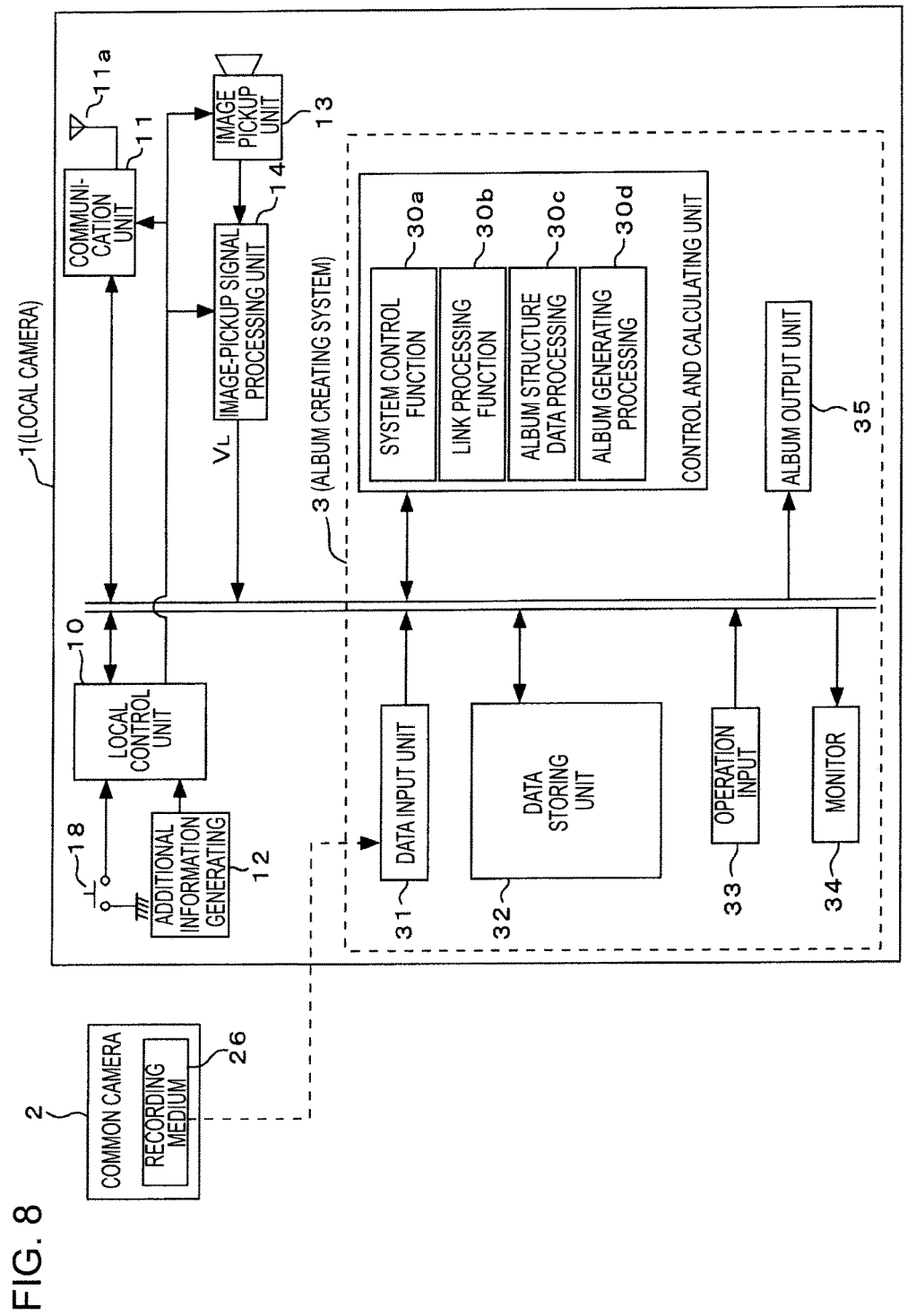
FIG. 8 is a block diagram showing the album creating system included in the local camera according to the embodiment.

Next, FIG. 8 shows a structure example in which the album creating system 3 is included in the local camera 1 as shown in FIG. 5(b). Note that the same reference numerals denote the same functional portions as those shown in FIGS. 2 and 6, and an overlapped description is omitted.

In this case, as will be understood with reference to FIG. 8, the local camera 1 includes, as the structure shown in FIG. 2, the units in the album creating system 3 as mentioned above with reference to FIG. 6, that is, the control and calculating unit 30, the data input unit 31, the data storing unit 32, the operation input unit 33, the monitor unit 34, and the album output unit 35.

However, in this case, the display unit 17 mentioned above with reference to FIG. 2 can be shared with the monitor unit 34. The recording and reproducing unit 19 may be shared with the data storing unit 32. Note that the local control unit 10 is a control unit for capturing the image and the control and calculating unit 30 is a control unit for creating the album. The local control unit 10 and the control and calculating unit 30 are provided as different blocks, and can be formed by one micro computer.

In this case, when the user presses the shutter switch 18 and the image is captured, the captured image data (local image VL) from the image pickup signal processing unit 14 is recorded to the data storing unit 32. In this case, the additional information ML generated by the additional information generating unit 12 with the link information is correlated and is recorded to the data storing unit 32.

In the album creating system 3, the local image VL is captured to the data storing unit 32 in the image capturing. Therefore, the common image Vc from the common camera 2 may be input from the data input unit 31 and may be recorded to the data storing unit 32.

In this case, the image data and the additional information are input in the following examples. Note that the example of the album structure data, the selecting example of the album structure data, and the output form of the album data are the same as those with the structure shown in FIG. 6.

Input example of image data to album creating system 3.

The image data Vc is input from the common camera 2 in the wireless communication.

The image data Vc is input from the common camera 2 in wire or wireless network communication.

The image data Vc is input by reproducing data on the recording medium 27 used by the common camera 2.

Input examples of additional information.

The additional information is input together with the image data from the common camera 2.

The additional information is input from the common camera 2 together with identification information (e.g., image data file-name) of the corresponding image data in an input form different from that of the image data.

<2-4: Structure of Album Creating System Included in Common Camera>

Figure 9:
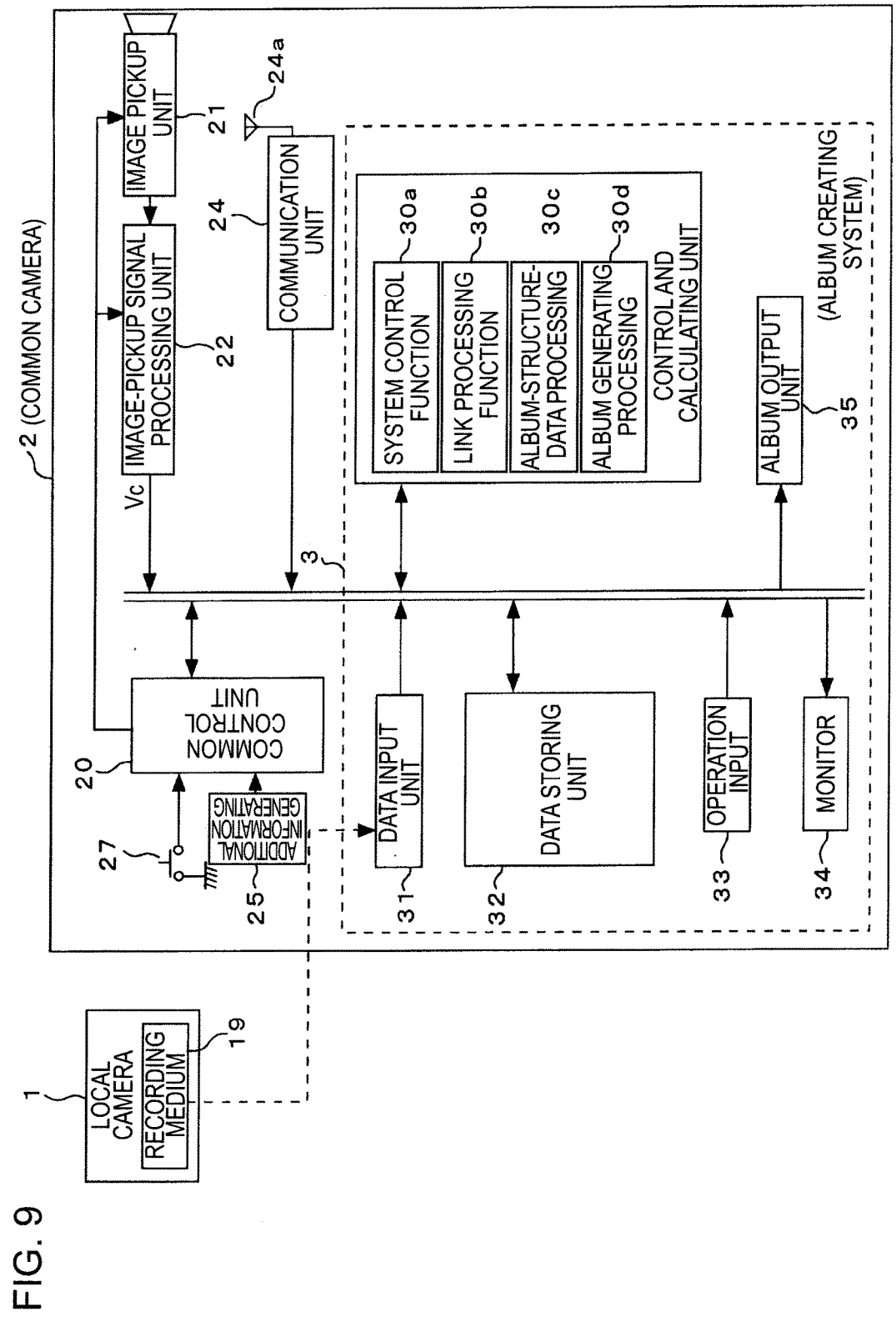
FIG. 9 is a block diagram showing the album creating system included in the common camera according to the embodiment.

Next, FIG. 9 shows a structure example in which the album creating system 3 is included in the common camera 2 as shown in FIG. 5(c). Note that the same reference numerals denote the same functional portions as those shown in FIGS. 2 and 6.

In this case, as will be understood with reference to FIG. 9, the common camera 2 includes, as the structure shown in FIG. 2, the units in the album creating system 3 as mentioned above with reference to FIG. 6, that is, the control and calculating unit 30, the data input unit 31, the data storing unit 32, the operation input unit 33, the monitor unit 34, and the album output unit 35.

However, in this case, a display unit for displaying data in the image capturing of the common camera 2 can be shared with the monitor unit 34. The recording and reproducing unit 23 may be shared with the data storing unit 32. Note that the common control unit 20 is a control unit for capturing the image and the control and calculating unit 30 is a control unit for creating the album. The common control unit 20 and the control and calculating unit 30 are provided as different blocks and, however, can be formed by one micro computer.

In this case, when the common camera 2 captures the image, the captured image data from the image pickup signal processing unit 22 is recorded to the data storing unit 32. In this case, the additional information Mc generated by the additional information generating unit 25 is correlated and is recorded to the data storing unit 32.

In the album creating system 3, the common image Vc is captured to the data storing unit 32 in the image capturing. Therefore, the local image VL from the local camera 1 may be input from the data input unit 31 and may be recorded to the data storing unit 32.

In this case, the image data and the additional information are input in the following examples. Note that the example of the album structure data, the selecting example of the album structure data, and the output form of the album data are the same as those with the structure shown in FIG. 6.

Input examples of image data to album creating system 3.

The image data VL is input from the local camera 1 in the wireless communication.

The image data VL is input from the local camera 1 in the wire or wireless network communication.

The image data VL is input by reproducing data in the recording medium 19 used for the local camera 1.

Input examples of additional information.

The additional information is input together with the image data from the local camera 1.

The additional information is input together with identification information (e.g., image data file-name) of the corresponding image data from the local camera 1 in an input form different from that of the image data.

[3. Album Creating Processing]

A description is given of the album creating processing of the album creating system 3 in the above examples.

It is assumed that, in the album creating processing, the data storing unit 32 needs to store the common image Vc captured by the common camera 2 and the additional information Mc and the local image VL captured by the local camera 1 and the additional information ML, as shown in FIG. 7.

At least one piece of the album structure data needs to be stored in the data storing unit 32 (incidentally, may be stored in a non-volatile memory in the control and calculating unit 30).

Figure 10:
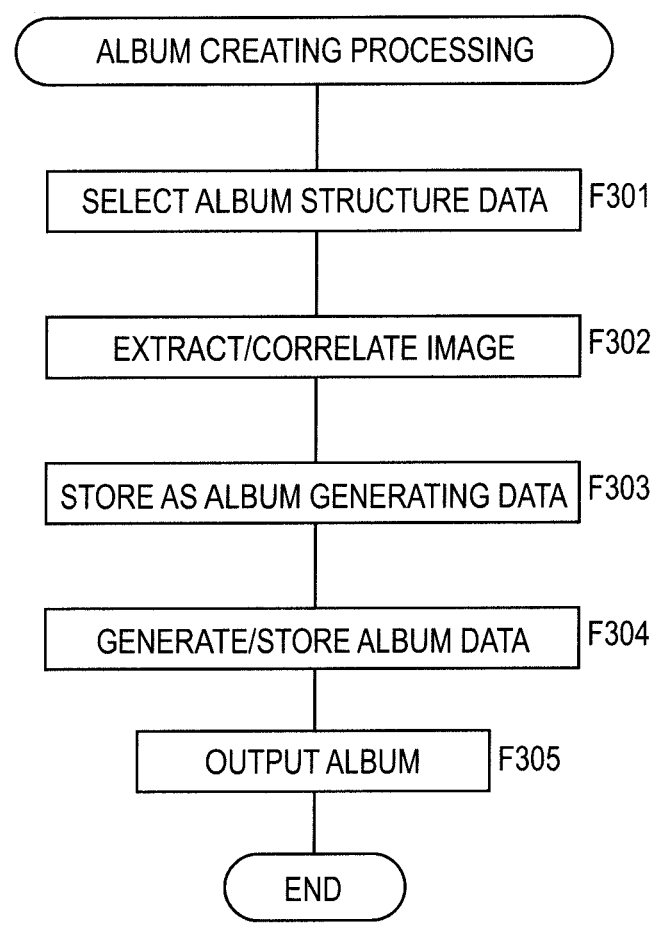
FIG. 10 is a flowchart of album creating processing according to the embodiment.

FIG. 10 shows the album creating processing executed by the control and calculating unit 30.

The album creating processing starts. First, in step F301, the album structure data is selected. Preferably, a large number of pieces of the album structure data are recorded to, e.g., the data storing unit 32. As described above, the album structure data is obtained by collecting basic information for the album structure including the image layout in the album, a background image, the front-page setting, the number of images, the number of album pages, a condition for correlating the local image VL with the common image Vc, and a moving image or a still image. That is, the selection of the album structure data determines the style of the generated album.

In step F301, the album-structure-data processing function 30c in the control and calculating unit 30 selects one piece of the album structure data by communication with a user (album creator) using, e.g., a user interface (the operation input unit 33 and the monitor unit 34).

In this case, e.g., the monitor unit 34 may display the album style as a model, on the basis of the album structure data, and the album creator may perform the selection of the album structure data while viewing the album style. The album-structure-data processing function 30c determines one piece of the album structure data in accordance with the selecting and determining operation of the user.

When the selected information of the album structure data from the external device without determining processing via the above user interface, the album-structure-data processing function 30c may determine the album structure data on the basis of the selected information. For example, if information on the album style based on the album structure data is provided in advance to the external device, such as the local camera 1 or the common camera 2, the user of the external device can select his/her desired album style.

Further, in step F301, the album creator may edit the album structure data or may newly create the album structure data via the user interface. For example, the album-structure-data processing function 30c allows the monitor unit 34 to display menu information, setting screen, layout candidate, background candidate, and link information which are used for edition and new album creation, and the user can create the album structure data in accordance with the display content.

One piece of the album structure data is determined. In step F302, the link processing function 30b correlates the image data with each other. Note that the processing in step F302 may be performed before step F301 or may be performed by another device. The album structure data includes the link information for correlating the images captured by a plurality of image pickup apparatuses with each other. For example, the link information includes time, image capturing position, event information, and personal information.

Subsequently, the link processing function 30b refers to the link information in the selected album structure data, and correlates the common image Vc with the local image VL under the link condition. In this case, the correlation between the common image Vc and the local image VL can be 1:1, 1:plural, and plural:1 under the link condition.

The selection of the image matching the link condition uses the additional information Mc corresponding to the common image Vc and the additional information ML corresponding to the local image VL.

As an example, the user ID and the image capturing time-information are used.

For example, when the service provider creates the album in response to the request of a user U1, the local image VL having the additional information ML including identification information (user ID) of the user U1 is extracted. That is, the local image VL is captured by the user U1. For the extracted local images VL, the time information included in the additional information ML is referred to. The additional information ML of the common image Vc is referred to, and the local image VL is correlated with the common image Vc whose time information matches or is approximate thereto.

For example, the image used for the album is extracted and the image is correlated by using the link condition and the additional information ML and Mc. In step F303, the link processing function 30b stores the information, as the album generating data, to the data storing unit 32.

The album generating data is extracted, as an image used for the album. The album generating data may be information including the correlated image data, or may be information (file name) indicating the correlation of the image without including the image data.

In step F304, the album generating processing function 30d generates the album data. That is, the image data (or the image data designated by the album generating data) in the album generating data is combined and is arranged in accordance with layout information of the album structure data, thereby sequentially generating the image data of one frame. The presence or absence of background, the design, and the number of pages (the number of frames) are based on the designation of the album structure data. The image data of n frames as generated above is one piece of the album data.

The generated album data is stored in the data storing unit 32.

Finally, in step F305, the control and calculating unit 30 controls the operation for outputting the album data stored in the data storing unit 32 from the album output unit 35 in the above-mentioned form.

When the service provider creates the album with the album creating system 3 as mentioned above, the general user receives the created album data, the album printed on the basis of the album data, or the link information of the album data, it is possible to view the album obtained by combining the local image VL captured by the general user and the common image Vc captured by the service provider.

Obviously, one user can edit the image data captured by him/her with a plurality of image pickup apparatuses by using the album creating system 3, and can similarly complete the album. Or, the image data captured by a plurality of users is collected and is input to the album creating system 3, thereby creating the album including the image data.

A description is given of examples of the album creating processing, as the processing shown in FIG. 10 with reference to FIGS. 11 to 14.

Figure 11:
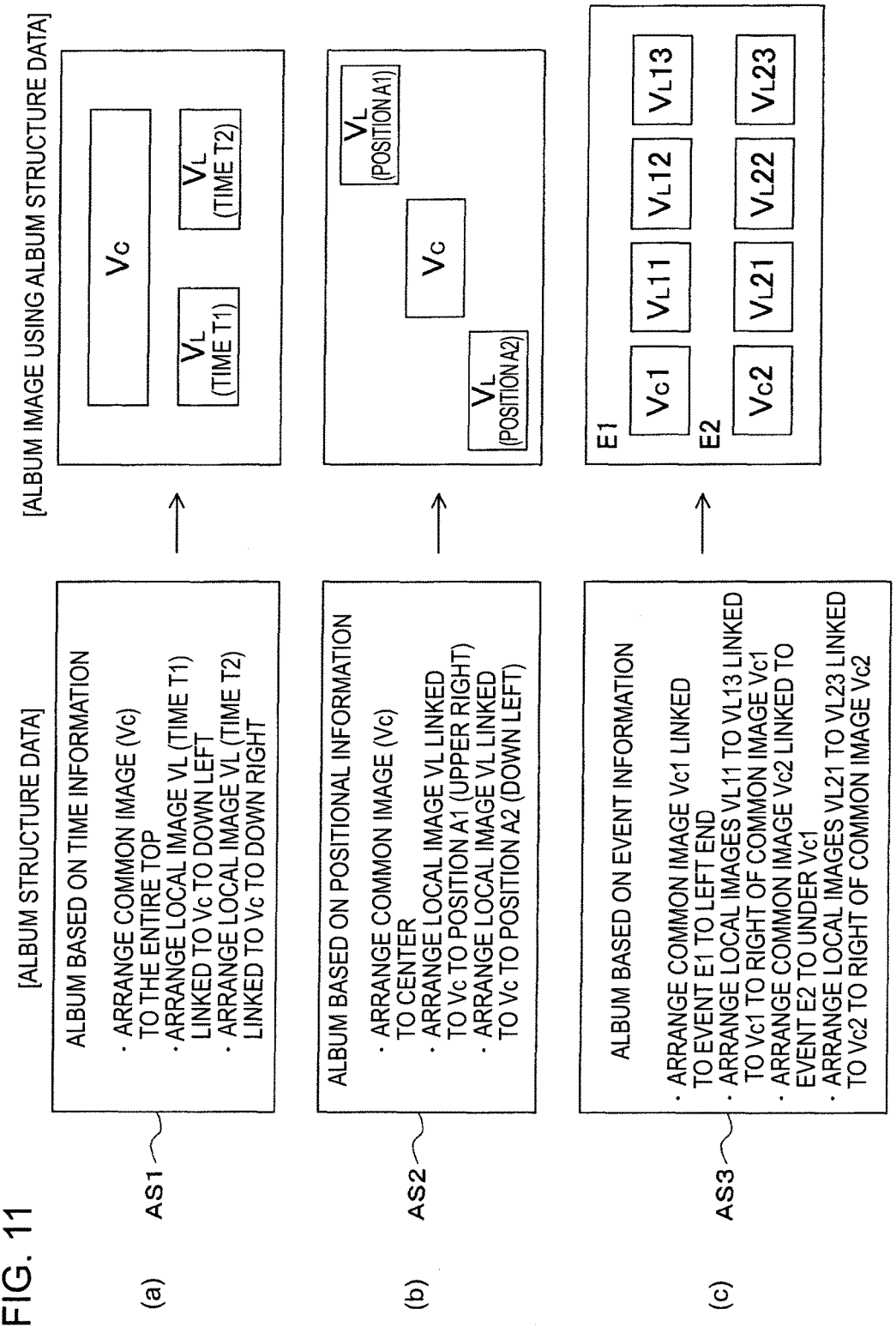
FIG. 11 is an explanatory diagram of album structure data according to the embodiment.

FIGS. 11(*a*), 11(*b*), and 11(*c*) show album structure data AS (particularly, the link condition and the layout information) having different settings and the viewing images using the album structure data AS.

In album structure data AS1 shown in FIG. 11(*a*), the time, as the link condition, is designated. As the layout information, it is designated that the common image Vc is arranged to the top of page and one or a plurality of pieces of the local image VL, close to the common image Vc in time, are sequentially arranged to the bottom of page in the time order. FIG. 11(*a*) shows the viewing image of the page in which two local images VL are correlated with one common image Vc.

In album structure data AS2 shown in FIG. 11(*b*), the position, as the link condition, is designated. As the layout information, it is designated that the common image Vc is arranged to the center of page and one or a plurality of the local images VL are arranged to the common image Vc with a positional relationship corresponding to the positional information. FIG. 11(*b*) shows the viewing image of the page in which two local images VL are correlated with one common image Vc and of the page in which the two local images VL are arranged to the upper right and the down left in accordance with positional information A1 and A2.

In album structure data AS3 shown in FIG. 11(*c*), event information (identification information of the object) is designated, as the link information. As the layout information, it is designated that the common image Vc is arranged to the left every event (e.g., every sport of the athletic competition) and, subsequently to the common image Vc, one or a plurality of pieces of the local images VL are arranged to the right. FIG. 11(*c*) shows the viewing image of the page in which, for events E1 and E2, three local images VL are individually correlated with one common image Vc.

Figure 12:
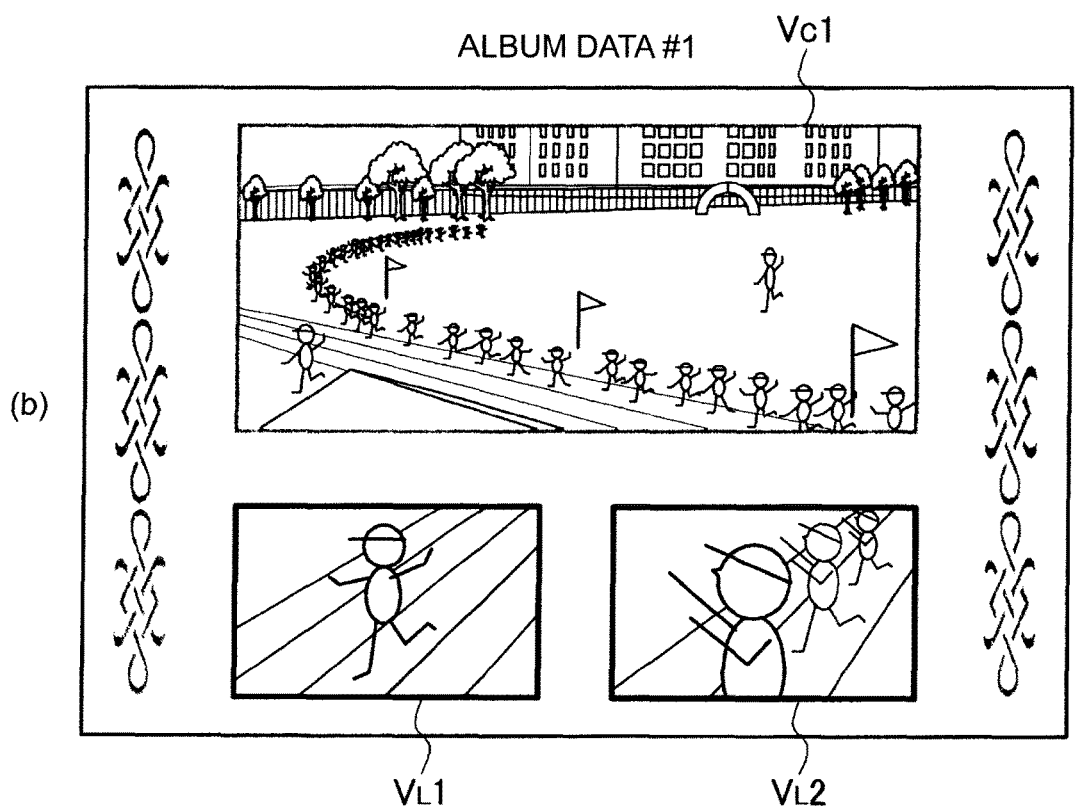
FIG. 12 is an explanatory diagram of first examples of album generating data and album data according to the embodiment.

FIG. 12 shows examples of the album generating data and the album data upon selecting the album structure data AS1 shown in FIG. 11(*a*) in step F301 in FIG. 10.

The album structure data AS1 designates, depending on the time, that the local image VL is correlated with the common images Vc. Therefore, the album generating data generated by the link processing function 30*b* in step F302 is obtained by correlating the images with each other on the basis of the time information of the additional information ML and Mc. For example, as shown in FIG. 12(*a*), the album generating data is obtained by correlating a common image Vc1 as an image of a first page #1 of the album with local images VL1 and VL2 captured at image capturing times T1 and T2 matching the image capturing time of the common image Vc1 or close thereto. A common image Vc2 as an image of a second page #2 of the album is correlated with local images VL3, VL4, and VL5 captured at image capturing times T3, T4, and T5 matching the image capturing time of the common image Vc2 or close thereto. The following pages are similar to the first and second pages of the album.

In step F304, the image data correlated by using the album generating data of the page is formed on the basis of information, such as the layout or background shown by the album structure data AS1. Therefore, the image data of one frame, as the first page #1 of the album data, using the common image Vc1 and the local images VL1 and VL2, is as shown in FIG. 12(*b*) as one example.

Herein, the image data used in FIG. 12(*b*) may be obtained by including enlarging and reducing processing of the image data. For thumbnail display operation of the original image data, the image data with low resolution may be provided in advance in the image capturing of the local camera 1 or the common camera 2, and may be used. Further, for the captured image data (image data with high resolution), the image data for print out with middle resolution and the image data for thumbnail display operation may be formed in the recording of the captured image data or in the processing of the image data by the album creating system 3, and may be used. For example, the local camera 1 and the common camera 2 may form the image data with high resolution of 1200 dpi, and the image data with high resolution of 1200 dpi may be formed as the image data with middle resolution of 600 dpi for print out or the image data with low resolution of 72 dpi or 100 dpi for thumbnail display operation. In the case shown in FIG. 12(*b*), the image data with high resolution and the image data with middle resolution can be used for the common image Vc1, and the image data with middle resolution can be used for the local images VL1 and VL2. The album creator may arbitrarily set, with which resolution of the image data, the album is created, the image data with middle resolution or more may be used for the image with large size, and the image data with middle resolution or less may be used for the image with small size. As mentioned above, the image data size in the album creation is set, thereby preparing the image data for creating the album suitable to the processing capacity of the album creating system. Further, the load of the album creating system can be reduced, and the operating efficiency can be improved. Obviously, the above description can be applied to the following album structure data AS2 and AS3 (that is, in FIGS. 13(*b*) and 14(*b*)).

Figure 13:
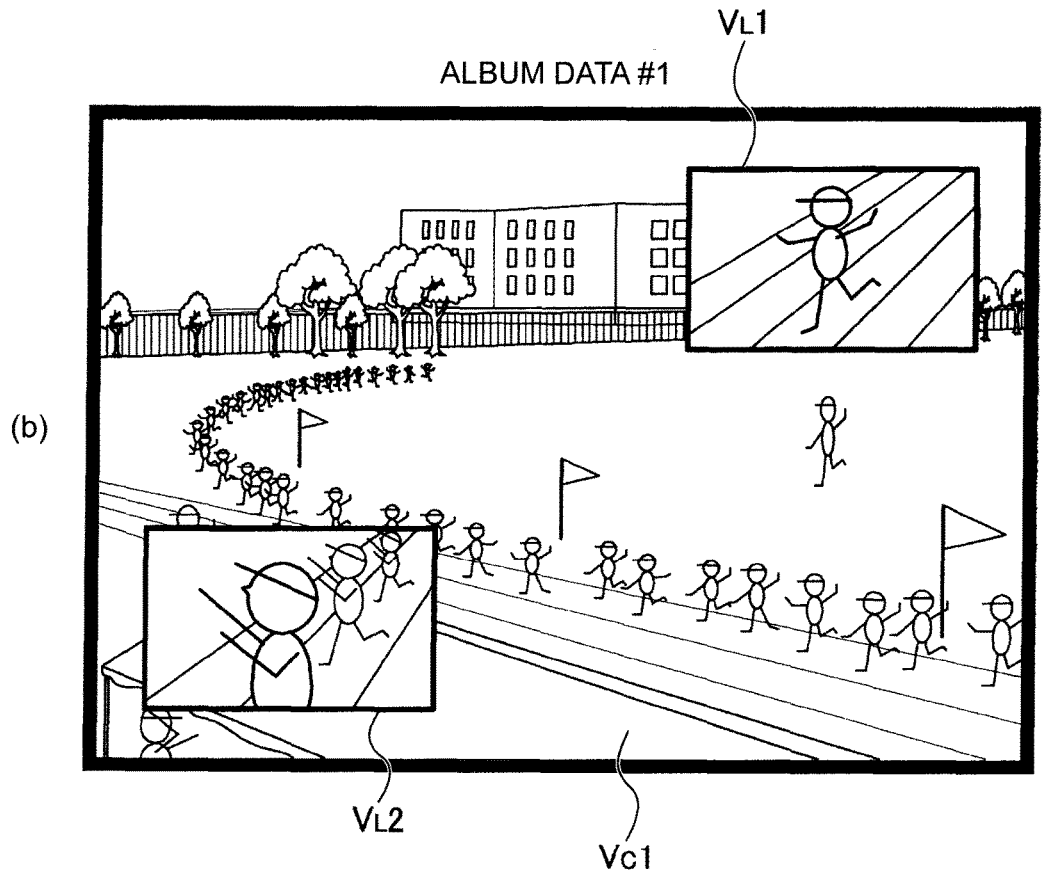
FIG. 13 is an explanatory diagram of second examples of the album generating data and the album data according to the embodiment.

FIG. 13 shows examples of the album generating data and the album data upon selecting the album structure data AS2 shown in FIG. 11(*b*) in step F301 in FIG. 10.

The album structure data AS2 corresponds to the designation, depending on the position, of the correlation between the local image VL and the common image Vc. Therefore, the album generating data generated in step F302 by the link processing function 30*b* correlates the images with each other on the basis of the positional operation of the additional information ML and Mc.

For example, the album generating data as shown in FIG. 13(*a*) correlates the common image Vc1, as the image of the first page #1 of the album, with the local images VL1 and VL2 captured at the image capturing positions A1 and A2 which are predetermined position to the image capturing positions of the common image Vc1. Further, the common image Vc2, as the image of the second page #2 of the album, is correlated with the local images VL3 and VL4 captured at a predetermined relationship between the positions A1 and A2 based on the image capturing position of the common image Vc2. Subsequent pages are the same as the foregoing.

In step F304, the processing is performed so that the image data correlated by using the album generating data of the page is formed on the basis of information, such as the layout or the background, shown by the album structure data AS2. Therefore, FIG. 13(*b*) shows, as one example, the image data of one frame which is the first page #1 of the album data using the common image Vc1 and the local images VL1 and VL2.

Figure 14:
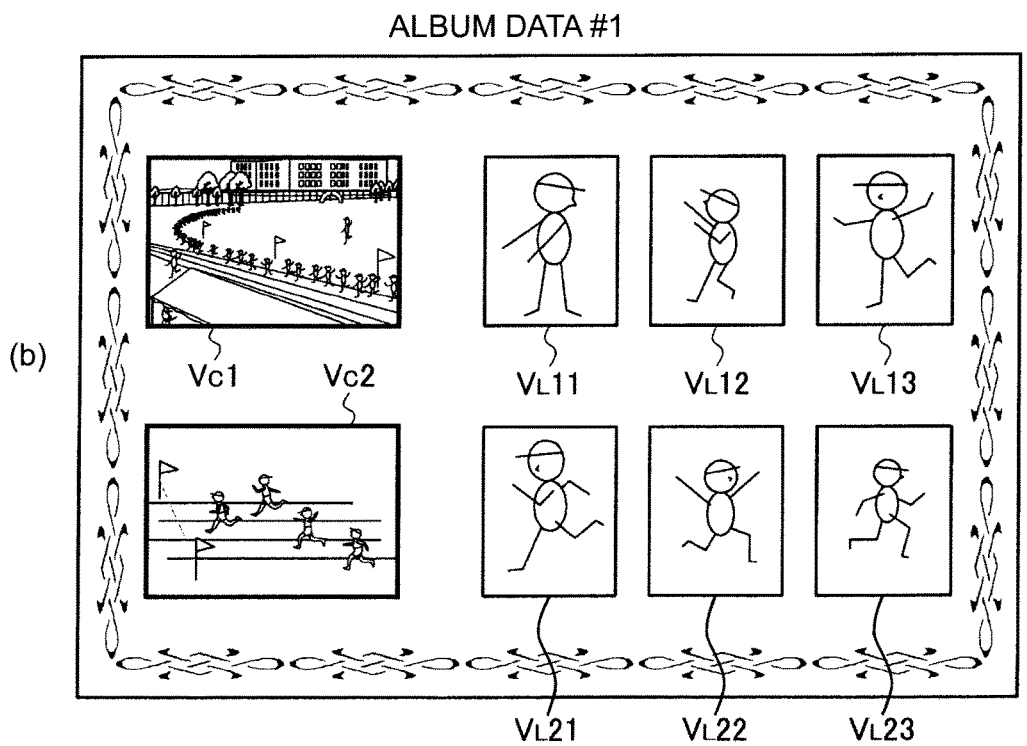
FIG. 14 is an explanatory diagram of third examples of the album generating data and the album data according to the embodiment.

FIG. 14 shows examples of the album generating data and the album data upon selecting the album structure data AS3 shown in FIG. 11(*c*) in step F301 in FIG. 10.

The album structure data AS3 designates, by using the event information (identification information of the object), the correlation between the local image VL and the common image Vc. Therefore, the album generating data generated by the link processing function 30*b* in step F302 correlates the images with each other on the basis of the event identification information of the additional information ML and Mc.

For example, the album generating data as shown in FIG. 14(*a*) correlates the common image Vc1 of one event E1, as the image of the first page #1 of the album, with the local images VL11, VL12, and VL13 that are obtained by capturing the image of the event E1 as the same event of the common image Vc1. Further, the album generating data correlates the common image Vc2 of the event E2 with the local images VL21, VL22, and BL23 obtained by capturing the image of the event E2 as the same event of the common image Vc2.

The common image Vc3 of an event E3, as the image of the second page #2 of the album, is correlated with a local image VL31 obtained by capturing the image of the event E3 as the same event of the common image Vc1. Further, a common image Vc4 of an event E4 is correlated with local images VL41 and VL42 obtained by capturing the image of the event 4 as the same event of the common image Vc4. Subsequent pages are the same as those as described above.

In step F304, the image data of the page correlated with the album generating data is formed on the basis of information, such as the layout or background shown in the album structure data AS3. FIG. 14(b) shows, as one example, the image data of one frame, as the first page #1, using the common image Vc1, the local images VL11, VL12, and VL13, the common image Vc2, and the local images VL 21, VL22, and BL23.

Note that the description is simplified for the purpose of a brief description. The link condition in the actual correlation of the link processing function 30b may be variously set, and may be shown in the album structure data.

For example, a user ID and a device ID of the common camera 2 can be added to the time information. Further, the link information can be obtained by combining the time information and the positional information. Furthermore, a plurality of specific user IDs can be set as the link condition, and the link condition can be variously considered. The link condition can be determined in accordance with the desire to the album, e.g., which image is extracted and is to be correlated from among the collected image data captured by a plurality of image pickup apparatuses. Incidentally, the device ID (common ID of the common camera) and the user ID (local ID of the local camera) may be identically set (Obviously, when the album creating processing does not need the common ID and the local ID, the common ID and the local ID may not be identified).

For example, a school that opens an athletic competition desires the creation of an album for ceremony using the image captured by family in addition to the whole captured image, preferably, the images are extracted and are correlated with each other by the time information and the positional information.

When one user requests the album creation to a service provider which captures the image by using the common camera 2, it is proper that the user ID is added to the link condition so as to identify the local ID. Because the user desires the album comprising the local image VL and the common image Vc captured by the user and the image captured by the general user is not added to the album.

When the album structure is desired with the correlation of a photo every attraction at a theme park, preferably, the event information is added to the link condition. Note that the event information may be obtained by adding the identification code of the event to the image data. Or, the event information may be set as one piece of event information by combining the time information and the positional information.

Further, the friends create the album by collecting the image captured at specific spaces at arbitrary day and time, the image data included in the album is extracted by using the positional information, and the image data is linked by the time information.

Note that the link information, as the link condition, may be included in the trigger. For example, a random number can be generated and can be set as the link information. Although it is preferable that the random number is globally unique, the random number may not match in probability. Further, the above-mentioned time information may be the link information. In this case, the image data may be linked by complete matching of the time information. Or, although the link information does not need to be generated, the image data may be linked by the reason of close time.

As will be understood on the basis of the operation, the above-mentioned album creating system can be usefully applied to the album creation having the captured image data, as the target, at various places and chances, such as the activities including an athletic competition and a presentation, a concert, an event, a theme park, sea, mountain, and another tourist resort.

[4. Modification and Program]

The album creating system according to the embodiment is described above. Further, various modifications can be considered, as an image editing apparatus and an image editing method for album creation according to the present invention.

In the examples, the album data is created by mainly collecting the still image data. Further, it is possible to create a so-called video album on the basis of the moving image data captured by an image pickup apparatus, as a plurality of video cameras.

For example, the moving image data captured by a plurality of video cameras is stored in the data storing unit 32, the moving image data is correlated by the time (time range) and the positional information, and the moving image data is extracted and is correlated with each other. The album data may be set so that correlated moving image data is simultaneously displayed on the divided screen. Alternatively, the album data may be set so as to insert a moving image, as the local image VL, into a slave screen in the moving image, as the common image Vc, or the album data may be created to be displayed while switching a front screen and a back screen (screen that is not usually displayed) in accordance with the operation in the reproduction by using the front screen and the back screen.

Further, the album data may be set by using the moving image data captured by one video camera and the still image data captured by one still camera. For example, a video album is created so that still image data, as the local image VL, is inserted in the continuous moving-video images, as the common images Vc, in accordance with the capturing time of the still image data.

Although audio recording is not described, e.g., audio data can be recorded in accordance with the recording of the moving image or still image, as the local image VL or the common image Vc.

In the case of the video camera using the moving-image data, the simultaneously-recorded audio data may be added to the album data. Further, in the case of the album comprising the still image data, the audio data near the image capturing time of the still image may be added.

A program according to the present invention realizes the image edition for album creation by, e.g., an information processing device, such as a personal computer. Under the program, the album creating system which obtains the above advantages can be realized without using a specific device.

Further, in a program recording medium that records the program, the album creating system can be easily provided, and the present invention can be widely provided for the service provider and the general user.

A program according to the embodiment can be recorded, in advance, to an HDD included in an apparatus, such as a personal computer or an image pickup apparatus, which is a recording medium, or to a ROM in a CPU.

Or, a program can be stored (recorded) temporarily or semipermanently to a removable recording medium, such as a flexible disc, a CD-ROM (Compact Disc Read Only Memory), an MO (Magnet optical) disc, a DVD (Digital Versatile Disc), a blue-ray disc, a magnetic disc, a semiconductor memory, or a memory card. The removable recording medium can be provided as so-called package software.

A program according to the present invention can be installed from the removable recording medium to the personal computer and, in addition, can be downloaded from a downloading site via a network, such as a LAN (Local Area Network) and the Internet.

What is claimed is:

1. An image processing system, comprising:
a display device; and
a central processing unit (CPU) configured to:
input first image data taken by a first image pickup apparatus, first additional information that corresponds to the first image data, second image data taken by a second image pickup apparatus different from the first image pickup apparatus and second additional information that corresponds to the second image data, wherein the first additional information is generated by the first image pickup apparatus and the second additional information is generated by the second image pickup apparatus;
determine a correlation between the first image data and the second image data based on the first additional information and the second additional information;
determine, based on the determined correlation, an album structure data from a plurality of album structure data, wherein the determined album structure data corresponds to link information for the determined correlation, wherein information associated with an event for which the first image data and the second image data are taken is designated as the link information; and
generate an album data to display the determined album structure data based on the determined correlation, wherein the first image data and the second image data are arranged based on layout information of the determined album structure data, on the display device.

2. The image processing system according to claim 1, wherein the layout information includes first layout position information for the first image data and second layout position information for the second image data.

3. The image processing system according to claim 1, wherein the second image pickup apparatus is an image pickup apparatus which captures a common image.

4. The image processing system according to claim 1, wherein the second image data in the determined album structure data is arranged such that the second image data in the determined album structure data has priority over the first image data in the determined album structure data.

5. The image processing system according to claim 1, wherein the second image pickup apparatus takes the second image data based on a trigger signal from the first image pickup apparatus, wherein the trigger signal is generated based on a shoot timing of the first image pickup apparatus.

6. The image processing system according to claim 1, wherein the CPU is arranged in at least one of the first image pickup apparatus or the second image pickup apparatus.

7. The image processing system according to claim 1, wherein the CPU is further configured to correlate a specific piece of the first image data with a specific piece of the second image data based on the link information.

8. The image processing system according to claim 7, wherein the CPU is further configured to correlate the specific piece of the first image data with the specific piece of the second image data based on the first additional information and the second additional information.

9. The image processing system according to claim 1, wherein the first additional information is first identification information of the first image pickup apparatus or of a user of the first image pickup apparatus and wherein the second additional information is second identification information of the second image pickup apparatus or of a user of the second image pickup apparatus.

10. The image processing system according to claim 1, wherein the first additional information and the second additional information are image-capture time information.

11. The image processing system according to claim 1, wherein the first additional information and the second additional information are image-capture positional information.

12. The image processing system according to claim 1, wherein the first additional information and the second additional information are identification information of an image pickup target.

13. The image processing system according to claim 1, wherein the CPU is further configured to output the generated album data onto a recording medium.

14. The image processing system according to claim 1, wherein the CPU is further configured to output the generated album data to an external device via a network.

15. The image processing system according to claim 1, wherein the CPU is further configured to output access information to allow a user to access the generated album data.

16. The image processing system according to claim 1, wherein the CPU is further configured to process the first image data and the second image data respectively acquired from the first image pickup apparatus and the second image pickup apparatus, wherein the second image data is arranged with respect to the first image data such that the second image data has priority over the first image data.

17. The image processing system according to claim 1, wherein the information associated with the event for which at least one of the first image data or the second image data taken is positional information.

18. The image processing system according to claim 1, wherein the information associated with the event for which at least one of the first image data or the second image data taken is time information.

19. The image processing system according to claim 1, wherein each of the plurality of album structure data includes the layout information that arranges the first image data and the second image data on the display device.

20. The image processing system according to claim 1, wherein the determined correlation between the first image data and the second image data is determined based on a link condition, and wherein the link condition corresponds to at least a user ID of the first image pickup apparatus.

21. An image processing apparatus, comprising:
circuitry configured to:
acquire first image data taken by a first image pickup apparatus, first additional information that corresponds to the first image data, second image data taken by a second image pickup apparatus different from the first image pickup apparatus and second additional information that corresponds to the second image data, wherein the first additional information is generated by the first image pickup apparatus and the second additional information is generated by the second image pickup apparatus;

determine a correlation between the first image data and the second image data based on the first additional information and the second additional information;

determine, based on the determined correlation, an album structure data from a plurality of album structure data, wherein the determined album structure data corresponds to link information for the determined correlation, wherein information associated with an event for which the first image data and the second image data are taken is designated as the link information; and arrange the determined album structure data as album data and display the determined album structure data, based on layout information of the determined album structure data, wherein the first image data is arranged so as to be correlated with the second image data.

22. A method of processing image data, comprising:

in at least one processor:

acquiring first image data taken by a first image pickup apparatus, first additional information corresponding to the first image data, second image data taken by a second image pickup apparatus different from the first image pickup apparatus and second additional information corresponding to the second image data, wherein the first additional information is generated by the first image pickup apparatus and the second additional information is generated by the second image pickup apparatus;

determining a correlation between the first image data and the second image data based on the first additional information and the second additional information;

determining, based on the determined correlation, an album structure data from a plurality of album structure data, wherein the determined album structure data corresponds to link information for the determined correlation, wherein information associated with an event for which the first image data and the second image data are taken is designated as the link information; and arranging the determined album structure data as album data to display the determined album structure data based on layout information of the determined album structure data, wherein the first image data is arranged so as to be correlated with the second image data, on a display device.

23. A non-transitory computer-readable medium having stored thereon, computer-executable instructions for causing a computer to execute operations, the operations comprising:

acquiring first image data taken by a first image pickup apparatus, first additional information corresponding to the first image data, second image data taken by a second image pickup apparatus different from the first image pickup apparatus and second additional information corresponding to the second image data, wherein the first additional information is generated by the first image pickup apparatus and the second additional information is generated by the second image pickup apparatus;

determining a correlation between the first image data and the second image data based on the first additional information and the second additional information;

determining, based on the determined correlation, an album structure data from a plurality of album structure data, wherein the determined album structure data corresponds to link information for the determined correlation, wherein information associated with an event for which the first image data and the second image data are taken is designated as the link information; and arranging the determined album structure data as album data to display the determined album structure data based on layout information of the determined album structure data, wherein the first image data is arranged so as to be correlated with the second image data, on a display device.

* * * * *